United States Patent
Winkler et al.

(10) Patent No.: US 10,001,753 B2
(45) Date of Patent: Jun. 19, 2018

(54) DEVICE FOR REGULATING THE MOTION OF A MECHANICAL HOROLOGICAL MOVEMENT

(71) Applicant: ETA SA Manufacture Horlogere Suisse, Grenchen (CH)

(72) Inventors: Pascal Winkler, St-Blaise (CH); Gianni Di Domenico, Neuchatel (CH); Jean-Jacques Born, Morges (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days. days.

(21) Appl. No.: 15/509,995

(22) PCT Filed: Sep. 4, 2015

(86) PCT No.: PCT/EP2015/070238
§ 371 (c)(1),
(2) Date: Mar. 9, 2017

(87) PCT Pub. No.: WO2016/037939
PCT Pub. Date: Mar. 17, 2016

(65) Prior Publication Data
US 2017/0300015 A1   Oct. 19, 2017

(30) Foreign Application Priority Data

Sep. 9, 2014 (EP) .................................. 14184158
Sep. 26, 2014 (EP) .................................. 14186682

(51) Int. Cl.
*G04C 3/08* (2006.01)
*G04C 5/00* (2006.01)

(52) U.S. Cl.
CPC ............... *G04C 5/005* (2013.01); *G04C 3/08* (2013.01)

(58) Field of Classification Search
CPC ...... G04C 3/08; G04C 3/10; G04C 3/16; G04C 5/005; G04B 18/02
See application file for complete search history.

(56) References Cited

U.S. PATENT DOCUMENTS 2,481,360 A * 9/1949 Sprenger .............. H02K 49/106
235/91 M
2015/0362892 A1* 12/2015 Zaugg .................... G04C 3/064
368/168

(Continued)

FOREIGN PATENT DOCUMENTS

BE           518187 A           2/1955
BE           530509 A           9/1957

OTHER PUBLICATIONS

International Search Report dated May 19, 2016, in PCT/EP2015/070238, filed Sep. 4, 2015.

*Primary Examiner* — Vit W Miska
(74) *Attorney, Agent, or Firm* — Oblon, McClelland, Maier & Neustadt, L.L.P.

(57) ABSTRACT

A device regulating motion of a mechanical horological movement includes: a frame; a resonator attached to the frame and including a first annular magnetic structure including N1 magnets arranged regularly in a circle and a resilient structure; a second annular magnetic structure including N2 magnets defining a central axis about which the structure rotates, N2 being different than N1. The resonator is configured so that a resonant mode in which the first magnetic structure is subject to curvilinear, or substantially circular, translation about the central axis may be excited by rotation of the second magnetic structure. The two magnetic structures define a magnetic cycloid gear such that the regulating device incorporates a reducer of frequency between the resonance frequency and the rotational fre- (Continued)

quency of the second magnetic structure which is rigidly connected to an escapement wheel.

25 Claims, 11 Drawing Sheets

(56) References Cited

U.S. PATENT DOCUMENTS

2016/0327908 A1* 11/2016 Winkler ................ G04C 5/005
2016/0370766 A1* 12/2016 Winkler ................ G04C 5/005

* cited by examiner

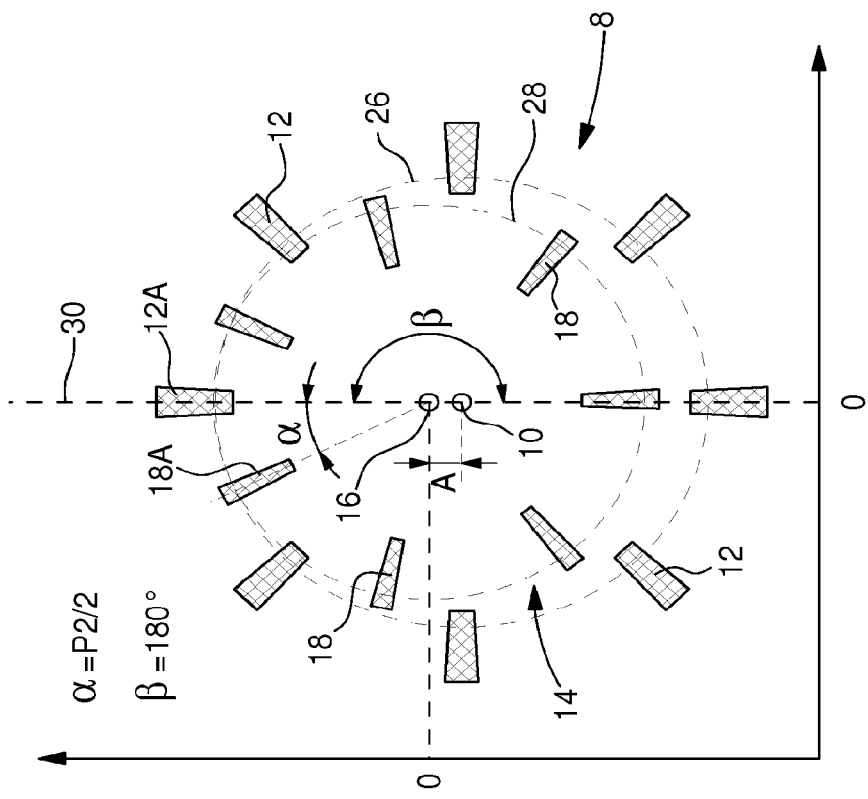
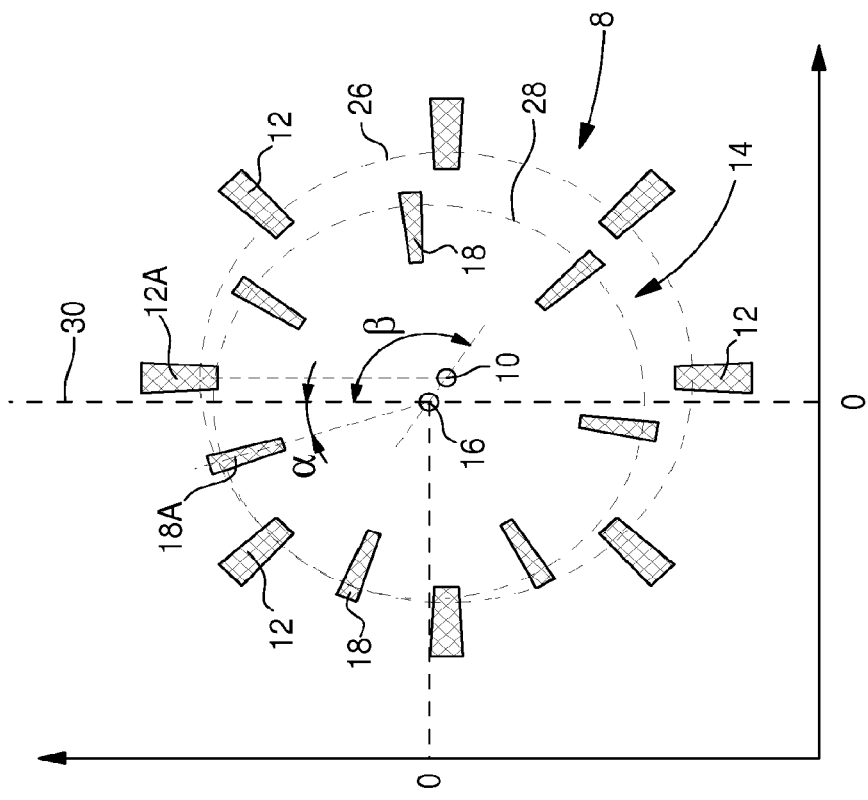

DEVICE FOR REGULATING THE MOTION OF A MECHANICAL HOROLOGICAL MOVEMENT

TECHNICAL FIELD

The present invention relates to the field of devices for regulating the relative angular velocity between a magnetic structure and a resonator which are magnetically coupled so as to define together such a regulating device.

In particular, the invention relates to a mechanical horological movement equipped with a device for regulating the motion thereof which is formed by a resonator and a magnetic escapement associated with said resonator. In the horological field, escapement generally means a system formed by a mechanism for maintaining the periodic movement of a resonant mode of the resonator and by a mechanism for counting the periods of said periodic movement in order to regulate the drive of a device, in particular of a display of at least one item of time information. It will be noted that the maintenance mechanism and the counting mechanism are generally formed by one and the same mechanism for distributing energy, supplied by a drive device, which fulfils both functions; as is the case in the context of the present invention.

In particular, the invention relates to magnetic regulating devices for mechanical horological movements in which a direct magnetic coupling is provided between a resonator and an annular magnetic structure.

Finally, the invention relates to a horological regulating device in which the escapement wheel has a continuous rotation, in other words not jerky as is the case in conventional regulating devices formed of a balance and spring assembly and a Swiss lever escapement forming a retainer and a toothed escapement wheel.

TECHNOLOGICAL BACKGROUND

In the field of mechanical watches, regulating devices are generally used that are formed of a balance and spring assembly which oscillates and of an escapement, in particular a Swiss lever escapement, comprising a retainer, in particular a lever, and a toothed escapement wheel, the retainer being an intermediate component between the balance and the escapement wheel and which oscillates in synchrony with the balance. The retainer has a to-and-fro movement with rest periods, which produces a jerky advance of the escapement wheel. Said regulating devices, although remarkably improved in the developments of traditional horology, have rather poor efficiency owing in particular to the oscillating movement of the lever with the two extreme rest positions thereof where said lever locks the escapement wheel. Cylinder escapements are also known, which have no lever. In the last case, the device forming a retainer is incorporated in an open tube forming the shaft of the balance. The escapement wheel also has a jerky advance and efficiency is greatly diminished by the fact that the teeth of said escapement wheel press successively and alternately against the inner wall and the outer wall of the open tube.

Devices for regulating the velocity of a wheel, also known as a rotor, by magnetic coupling, also known as magnetic linkage, have also been known for many years, which devices allow the drawbacks of the above-mentioned conventional devices to be overcome. Application in horology is also known, but industrial productions are rare, if not non-existent. Numerous patent applications relating to this field have been filed by Horstmann Clifford Magnetics for the inventions of C. F. Clifford. Documents FR 1.113.932 and U.S. Pat. No. 2,946,183 in particular will be cited. Also known from the Japanese utility model JPS 5263453U (application no. JP19750149018U) is a magnetic escapement of the same type with a direct magnetic coupling between a resonator and an escapement wheel formed by a disk supporting two coaxial annular magnetic tracks. Said two magnetic tracks are substantially contiguous and each comprise wafers with high magnetic permeability forming magnetic zones which are arranged regularly with a given angular period, the wafers of the first track being displaced or shifted by a half-period relative to the wafers of the second track. Non-magnetic zones, in other words zones of low magnetic permeability, are provided between the wafers. Zones of high magnetic permeability are thus obtained distributed alternately on both sides of a circle corresponding to the rest position of at least one magnet carried by the end of a branch of a diapason-type resonator. The magnet of the resonator is coupled magnetically to said two shifted tracks so that said magnet is attracted alternately by the magnetic zones of the first track and of the second track. The escapement wheel therefore rotates with a rotational speed such that said wheel advances by an angular period of the two tracks at each oscillation of the resonator. What is noteworthy in such a system is the absence of mechanical friction in the magnetic escapement and the fact that the escapement wheel has a substantially continuous rotation in a single direction of rotation.

It will be observed that magnetic regulating devices of the above-mentioned type are provided for resonators which have just one degree of freedom for each portion that is subject to a resonance movement. In general, the resonator is arranged so that the magnet, carried by a component that is subject to a resonance movement, oscillates in a substantially radial direction, in other words substantially orthogonal to the two annular magnetic tracks. In this case, the productions of the prior art mentioned have the advantage of having a reduction in frequency between the frequency of the oscillation of the resonator and the rotational frequency (in revolutions/second) of the escapement wheel that carries the magnetic structure. No pivoted mobile rotates or oscillates at a frequency of the order of magnitude of the resonance frequency. The reduction factor is given by the number of angular periods of the annular magnetic tracks.

However, the advantage resulting from a reduction in frequency between the oscillation of the resonator and the rotation of the escapement wheel has a corollary which poses a problem for the magnetic coupling force given the dimensions of a conventional horological movement. The reason is that to increase the frequency reduction, the number of periods of the magnetic tracks must be increased. For a given diameter of the escapement wheel, an increase in the number of periods has the consequence of reducing the surface area of the magnetic zones of the annular tracks. As the magnet of the resonator extends generally over an angular distance of less than a half-period of the annular tracks, the dimensions of said magnet must also be reduced when the frequency reduction increases. It will therefore be understood that the magnetic interaction force between the resonator and the escapement wheel reduces, which limits the torque that can be applied to the escapement wheel and therefore increases the risk of loss of synchronisation between said resonator and said escapement wheel, also known as pulling the regulating system out of synchronisation. Synchronisation here means a given proportional relationship between the resonance frequency and the rotational frequency of the escapement wheel.

SUMMARY OF THE INVENTION

The object of the present invention is to provide a novel type of device for regulating the motion of a horological movement in which the resonator has a resonant mode that can have a higher frequency than the rotational or oscillation frequency of the mobiles of said horological movement and in which all the mobile portions have a continuous movement in the same direction.

Accordingly, the present invention relates to a device for regulating the motion of a mechanical horological movement, said regulating device comprising:
  a frame;
  a resonator attached to the frame and comprising a first annular periodic magnetic structure which has a first whole number N1 of angular periods and which defines a first central axis, said first magnetic structure forming the inertial portion of the resonator;
  a second annular periodic magnetic structure which has a second whole number N2 of angular periods and which defines a second central axis, the second number N2 being different from the first number N1, said second magnetic structure being arranged so as to be able to rotate relative to the frame about the second central axis which has a determined position relative to said frame.

At least one magnetic structure from among the first and second magnetic structures has magnetised material in each of the angular periods thereof. The resonator is arranged so that it has a resonant mode in which the first magnetic structure follows a curvilinear translation, in particular a substantially circular trajectory, relative to the frame about the second central axis with a resonance frequency F1 without said first magnetic structure rotating on itself relative to said frame (in other words, the first magnetic structure is subject to a curvilinear translation about the second central axis). The first and second magnetic structures are arranged so as to have a magnetic interaction between them such that the above-mentioned relative rotation of the second magnetic structure, by the application of torque within a useful torque range, excites said resonant mode and such that the frequency F2 of said relative rotation of the second magnetic structure and the resonance frequency F1 have between them a given relationship $R_{Fr}$, that is $R_{Fr}=F1/F2$, which is equal to the second whole number N2 divided by the difference $\Delta N$ between said second number N2 and the first number N1, that is $\Delta N=N2-N1$ and $R_{Fr}=N2/\Delta N$. In a particular variant, the magnetised material of said at least one magnetic structure is magnetised axially.

In a main embodiment, the resonator comprises a resilient structure connecting the first structure to the frame, said resilient structure being arranged so that the first magnetic structure has a rest position in which the first and second central axes are substantially merged, and so as to apply a return force (centripetal force) substantially in the direction of the second central axis whatever the angular position of the first magnetic structure relative to said second central axis. In a preferred variant, the return force of the resilient structure provided is substantially isotropic and substantially proportional to the distance between the first and second central axes. A substantially isochronous system is thus obtained.

In an improved embodiment, the regulating device of the invention further comprises a mechanical anti-loss-of-synchronisation system between the first and second magnetic structures which is formed by a planetary gear with a planet wheel provided with a first set of teeth and rotating inside a crown provided internally with a second set of teeth. The planet wheel is associated with the structure that has the lower number of angular periods from among the first and second magnetic structures and the crown is associated with the other structure that has the higher number of angular periods. Next, the structure associated with the second magnetic structure is rigidly connected in rotation to said second structure. Provision is made, at least in an upper zone of the useful torque range, of which the higher value defines the maximum value of said useful range, for the first and second sets of teeth to penetrate one another at least in part. Said first and second sets of teeth are configured and arranged relative to one another so that, within said useful range, said sets of teeth do not touch one another, the coupling between the first and second magnetic structures being purely magnetic within said useful range.

In a main variant, the relationship $R_Z$ between the number Z1 of teeth in the set of teeth of the crown and the number Z2 of teeth in the set of teeth of the planet wheel is equal to the relationship $R_M{}^*$ between the higher number of angular periods and the lower number of angular periods.

According to a particular variant of the above-mentioned improved embodiment, said useful torque range is a first useful range of purely magnetic coupling of the first and second magnetic structures, the maximum value of said first useful range being less than a loss-of-synchronisation value of said purely magnetic coupling. The regulating device also operates in a second useful torque range, greater than the first useful range and contiguous thereto, corresponding to a useful range of magneto-mechanical coupling in which the first and second sets of teeth mesh with one another so that one applies a mechanical driving torque to the other. The first and second sets of teeth are configured and arranged relative to one another so that, at least in a lower zone of the second useful range of which the lower value defines the minimum value of said second useful range, said first and second sets of teeth have some radial play allowing an increase of the amplitude of the curvilinear translation generated in said resonant mode that is excited during an increase in the torque. Finally, the resilient structure is arranged so as to have substantially resilient deformation, preferably a purely resilient deformation, in the first and second useful ranges of torque applied to the regulating device.

According to an improved variant, the first set of teeth of the planet wheel is arranged relative to the second set of teeth of the crown so that, in a zone of the useful torque range in which said first and second sets of teeth have contactless penetration, some teeth of the first set of teeth situated in the corresponding spaces of the second set of teeth, in the zone where the first and second sets of teeth are radially closest, are substantially centred within a given total tangential play for a median relative angular shift, between the angular periods of the first magnetic structure and the angular periods of the second magnetic structure, within a range of relative angular shift defined by a variation of the torque within said useful range.

The invention also relates to a mechanical horological movement comprising a regulating device according to the invention, a counting wheel regulated by said regulating device and a motor device driving the counting train and maintaining a resonant mode of the regulating device.

Other particular characteristics of the invention will be explained below in the detailed description of the invention.

BRIEF DESCRIPTION OF THE DRAWINGS

The invention will be described below with the aid of the accompanying drawings, given as completely non-limiting examples, in which:

FIG. 3A to 3D are four diagrammatic illustrations of four successive positions respectively of the regulating device in a variant of the first embodiment;

DETAILED DESCRIPTION OF THE INVENTION

Figure 1:
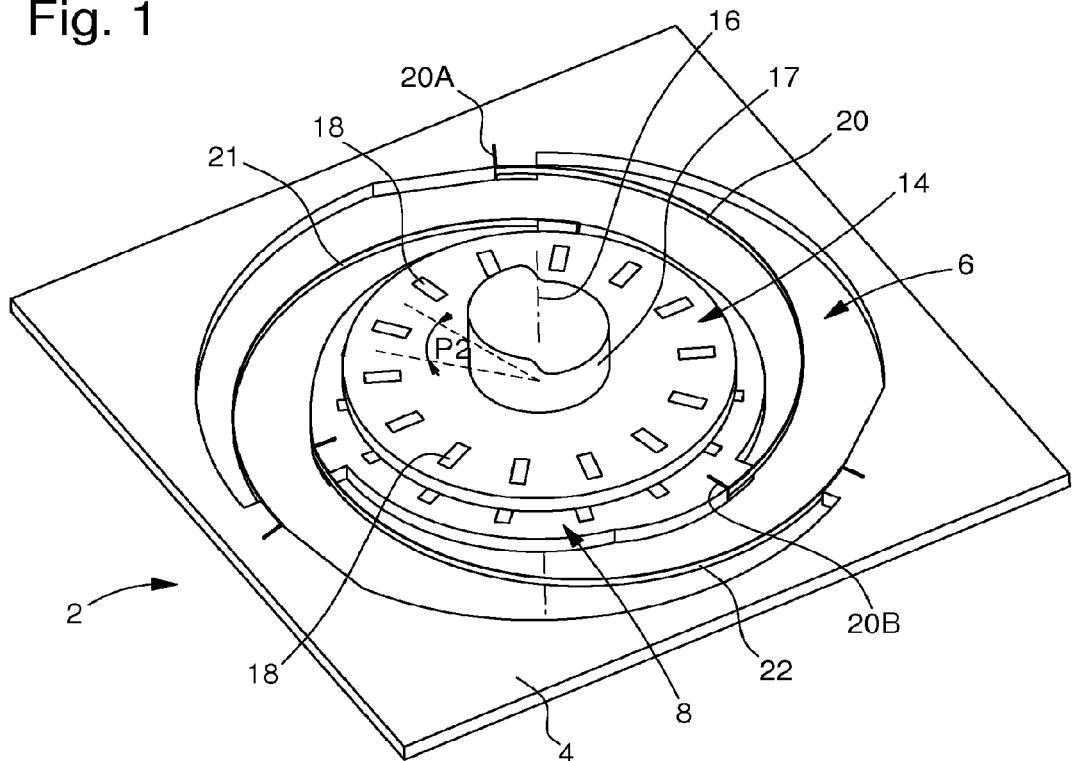
FIG. 1 shows in perspective a first embodiment of a regulating device according to the invention.
Figure 2:
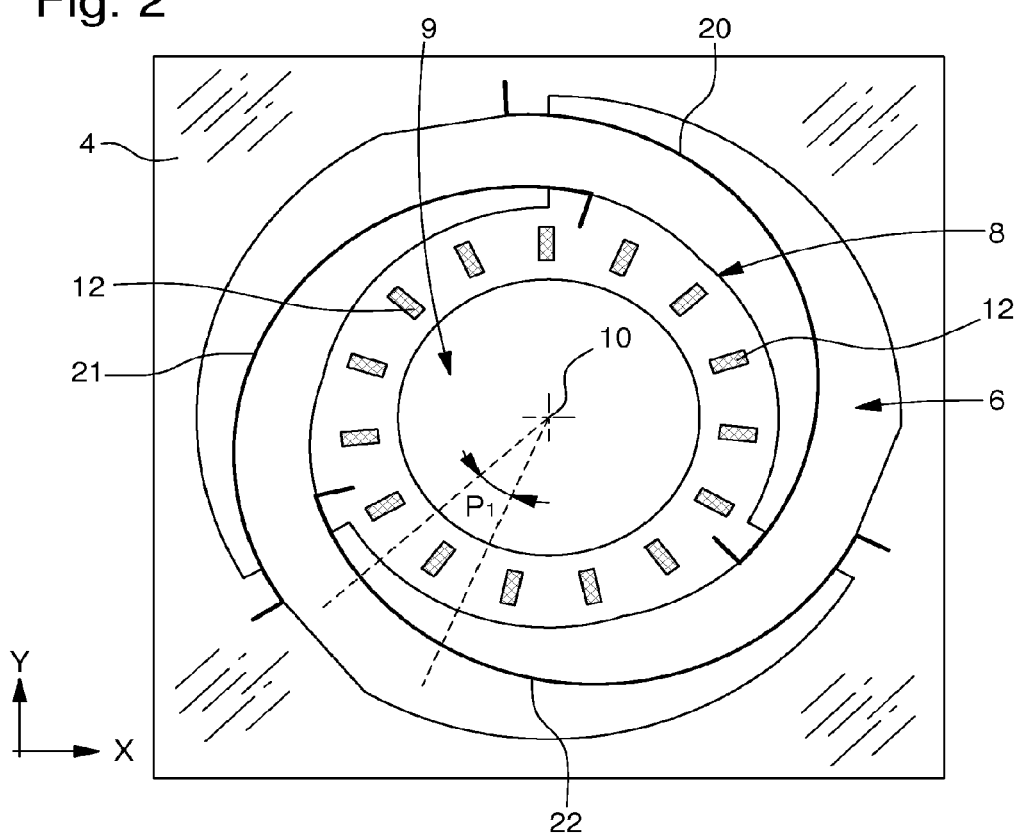
FIG. 2 shows a plan view of the resonator of the regulating device of FIG. 1.

With the aid of FIGS. 1, 2 and 3A to 3D, a first embodiment of the invention will be described. The regulating device 2 comprises:

- a frame 4;
- a resonator 6 attached to the frame and comprising a first annular periodic magnetic structure 8 which has a first whole number N1 of angular periods P1 defining a first central axis 10, said first magnetic structure forming the inertial portion of the resonator;
- a second annular periodic magnetic structure 14 which has a second whole number N2 of angular periods P2 defining a second central axis 16, the second number N2 being different from the first number N1.

In a general way, $N1 \cdot P1 = N2 \cdot P2 = 360°$ and therefore $N1/N2 = P2/P1$. In the variant shown in FIGS. 1 and 2, $N1=15$ and $N2=14$. The second magnetic structure 14 is arranged so as to be able to rotate relative to the frame 4 about the second central axis 16 which has a determined fixed position relative to said frame. The first magnetic structure 8 comprises an annular non-magnetic support that has a central opening 9 and a first number N1 of magnets 12 distributed regularly and in a circle on or in said support. The second magnetic structure 14 is supported by a non-magnetic disk connected to a shaft 17 and comprises a second number N2 of magnets 18 [which] are distributed evenly and in a circle on or in said disk.

In said first embodiment, the first and second magnetic structures are arranged in two different general planes which are parallel. Next, the plurality of magnets 12 and the plurality of magnets 18 are magnetised axially and are arranged to repel one another.

The resonator 6 comprises a resilient structure, formed in the variant shown by three resilient strips 20, 21 and 22, which connect the first magnetic structure 8 to the frame 4. It could be said that the structure 8 is suspended on the frame by means of the resilient structure. Each resilient strip has a first folded end 20A which is anchored in a slot of the frame 4 and a second folded end 20B which is anchored in a slot of the annular support of the resonant magnetic structure 8. Said resilient structure is arranged so that the first magnetic structure has a rest position in which the first and second central axes 10 and 16 are merged or virtually merged, and so as to apply a return force substantially in the direction of the second central axis 16 whatever the angular position of the first magnetic structure relative to said second central axis. Preferably, the return force of the resilient structure is substantially proportional to the distance between the first and second central axes, in other words to the amplitude A of the circular resonance movement about the central axis 16 (see FIG. 3D).

As shown schematically in FIG. 3A to 3D which show four corresponding angular positions of the first and second magnetic structures during the resonance movement provided, the resonator 6 is arranged so that it has a resonant mode in which the first magnetic structure undergoes, relative to the frame, a substantially circular translation about the second central axis 16 with a given resonance frequency F1. The first and second magnetic structures are arranged so that the respective two pluralities of magnets thereof have a magnetic interaction therebetween such that a relative rotation of the second magnetic structure about the second central axis 16, by the application of torque within a useful torque range for normal operation of the horological movement incorporating such a regulating device, excites the above-mentioned resonant mode and so that the frequency F2 of the relative rotation of the second magnetic structure and the resonance frequency F1 have therebetween, within the above-mentioned useful torque range, a determined relationship $R_{Fr}$, that is $R_{Fr}=F1/F2$. Said relationship $R_{Fr}$ is equal to the second whole number N2 divided by the difference $\Delta N$ between the second whole number N2 and the first whole number N1, that is $\Delta N = N2-N1$ and $R_{Fr}=N2/\Delta N$.

In the two variants shown in FIGS. 1, 2 and 3A to 3D, the difference as an absolute value $|\Delta N|$ between the second number N2 and the first number N1 is equal to one, that is $|\Delta N|=1$. Next, preferably, as is the case in said two variants, the relationship $R_{Fr}$ is greater than five, that is $R_{Fr}>5$.

It will be observed that the torque is preferably supplied to the second magnetic structure 14 by means of the shaft 17. However, in a variant of a horological movement incorporating such a regulating device, the magnetic structure 14 is fixed and it is the frame 4 that is driven in rotation by torque about the central axis 16. It will be noted that, in another variant, the two structures can turn about the axis 16, the difference in the torques applied respectively to the frame and to the second magnetic structure defining the useful torque supplied to the regulating device. Whichever variant is considered, it is however possible to speak of a rotation of the magnetic structure 14 relative to the frame 4 and thus of a relative rotation of said magnetic structure 14, and therefore to refer to said magnetic structure as 'a rotating magnetic structure'.

The regulating device according to the invention is noteworthy in particular because it incorporates a cycloid speed increasing gear or cycloid speed reducing gear respectively. More specifically, as shown schematically in FIG. 3A to 3D, the first magnetic structure 8 of the resonator and the second magnetic structure 14 are configured and arranged relative to one another so that the resonant magnetic structure defines a first mobile of a cycloid magnetic gear whereas the magnetic structure that actuates the resonance movement (or the magnetic structure that excites the resonant mode, also referred to hereinafter as the rotating magnetic structure) defines a second mobile of said cycloid magnetic gear. The magnets of the resonant magnetic structure follow cycloid trajectories when the magnets of the rotating magnetic structure rotate, relative to the frame of the resonant magnetic structure, about the central axis of said rotating magnetic structure. To do this, the invention selects a particular cycloid gear in which the first mobile associated with the resonator is subject to a resonance movement with two degrees of freedom following a generally curvilinear trajectory, preferably a substantially circular trajectory, about the central axis 16 of the second mobile without rotating on itself relative to the frame and in which the second mobile serves to excite and maintain the corresponding resonant mode, in other words to produce the resonance movement by actuating the first mobile relative to the frame to which said mobile is connected by a resilient structure. In other words, said first mobile is subject, when the resonance movement is actuated and stabilised, to a curvilinear translation about the axis 16, the position of which is fixed and determined relative to the frame, and preferably a substantially circular translation centred on said axis 16. In FIG. 3A to 3D, an optimal case has been chosen with a circular translation. It is therefore possible to speak of a regulating device with a cycloid resonance movement or more briefly a cycloid regulating device.

By analogy with the mechanical case, when said resonant mode is actuated and the magnetic interaction between said two structures is sufficient to provide magnetic synchronisation coupling between the above-mentioned relative rotation of the second structure and the substantially circular translation of the first magnetic structure, the two magnetic structures have magnetic meshing such that a primitive circle 26 of the first magnetic structure 8 rolls virtually without slipping on a corresponding primitive circle 28 of the second magnetic structure 14. Here, synchronisation generally means a given and substantially fixed relationship between the rotational frequencies present, that is, between the resonance frequency and the rotational frequency of the second magnetic structure. The primitive circles are geometric circles defining a virtual rolling path. The relationship R of the respective radii R1 and R2 of the primitive circles 26 and 28 is fixed by the relationship $R_M$ of the respective numbers of magnets N1 and N2 of the two magnetic structures, that is, $R=R1/R2=R_M=N1/N2=P2/P1$. Furthermore, in the specific case of the cycloid gear provided for the invention, the frequency F1 of the circular translation about the axis 16, corresponding to the resonance frequency of the resonator, is a function of the rotational frequency F2 of the second magnetic structure about said axis 16 relative to the frame, said function being given by the mathematical relationship $F2 \cdot N2 = F1 \cdot (N2-N1)$. The relationship $R_{Fr}$ of the frequencies F1 and F2 given by $R_{Fr}=F1/F2=N2/\Delta N$ where $\Delta N=N2-N1$ can be deduced from said mathematical relationship. The following mathematical relationship is thus obtained between the relationships $R_{Fr}$ and R, respectively $R_M : R_{Fr}=1/(1-R)=1/(1-R_M)$. It can therefore be seen that the rotational frequency of the second magnetic structure is determined by the resonance frequency of the resonator; which permits regulation of the motion of a horological movement equipped with a counting train coupled to the portion of the regulating device which defines an escapement wheel.

It will be noted that the relationship of the frequencies may be positive or negative depending on whether the relationship $R_M$ of the numbers of angular periods N1 and N2 is greater than or less than one. A negative relationship $R_{Fr}$ indicates that the direction of circular translation of the resonant magnetic structure is reversed in relation to the direction of relative rotation of the magnetic structure that excites the expected resonant mode (rotating magnetic structure); which is the case in the example shown in FIG. 3A to 3D where the resonant magnetic structure 8 has a greater number of magnets than the rotating magnetic structure 14. It will be observed that in the different variants, the magnets may be arranged in different radial positions without the relationship R of the respective radii R1 and R2 of the primitive circles 26 and 28 changing. Persons skilled in the art will optimise said radial positions in order to optimise the magnetic coupling between the two magnetic structures within the useful torque range applied to the regulating device of the invention. Magnetic structure means firstly the magnetic portions or elements (magnets or materials with high magnetic permeability participating in the magnetic interaction in question) which form the magnetic structure, the support of said magnetic portions or elements being materially necessary but secondary for magnetic coupling. 'Annular magnetic structure' therefore means an arrangement of magnetic portions or elements in an annular, in particular in a circular, fashion. Only the magnets of the two magnetic structures have been shown In FIG. 3A to 3D.

Figure 3B:
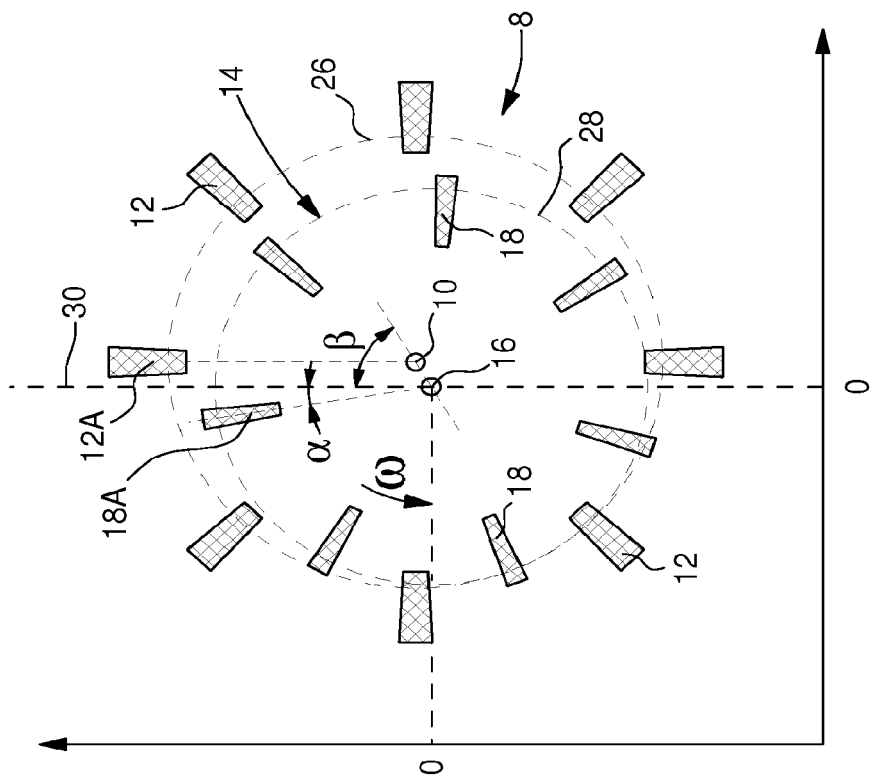
Figure 3A:
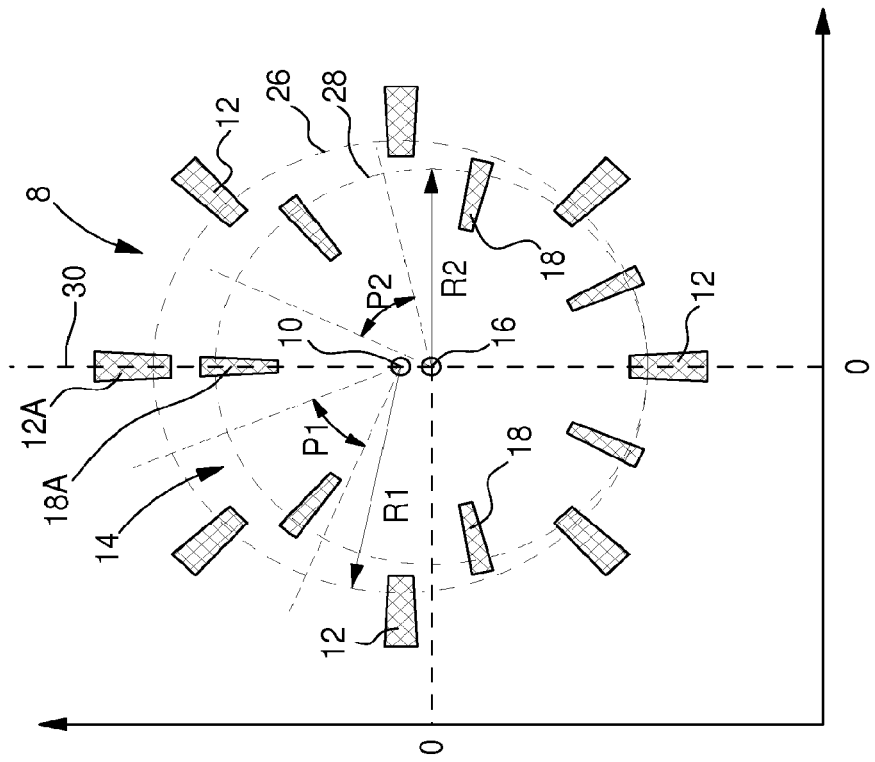

FIG. 3A starts with a relative position in which two respective magnets 12A and 18A of the two magnetic structures 8 and 14 are aligned on the vertical axis 30 and also the two respective central axes 10 and 16. In the variant shown in FIG. 3A to 3D, the structure 8 comprises eight magnets 12 whereas the structure 14 comprises seven magnets 18. As shown in FIG. 1, the two magnetic structures are arranged in general parallel planes that are distant from one another, the pluralities of magnets 12 and 18 being axially magnetised and being arranged in repulsion. It will be understood that the two vertically aligned magnets repel one another and that the magnets in the diametrically opposite zone penetrate, one between two others, and repel one another less strongly, or even attract one another depending on the arrangement provided. It will therefore be noted that there is a radial magnetic force with a difference in magnets $|\Delta N|=1$ which produces an initial decentring of the axis 10 relative to the axis 16 in the rest state of the regulating device and therefore at the start of the relative rotation of the magnetic structure 14. This decentring may allow sufficient magnetic coupling between the two magnetic structures to excite the resonant mode on starting. It will be observed that the modulus of elasticity of the resilient structure and the inertial mass of the resonator basically determine the resonance frequency. When there is resonance, the return force of the resilient structure corresponds to the centripetal force needed to produce the circular translation of the structure 8, in the absence of other parasitic forces, such that radial magnetic force is not then necessary. The amplitude of the resonance movement depends on the torque applied and also on the value of the return force producing the centripetal force, but said two forces remain equal if there is resonance in the absence of other parasitic forces. A specific arrangement of the two magnetic structures can therefore be provided for which the radial magnetic force is cancelled during a resonance movement at least for a torque value within the expected useful range. Preferably, said specific arrangement is such that the radial magnetic force has a relatively low value, in particular substantially zero, for the entire useful torque range, so as to obtain the most isochronous possible operation of the regulating device within said entire useful range. It will further be observed that an increase in the amplitude A (the distance between the central axes 10 and 16) produces greater penetration of the magnets of the two magnetic structures.

Shown in FIGS. 3B and 3C are two relative positions of the two magnetic structures during excitation of the resonant mode provided, which produces a circular translation of the resonant magnetic structure 8 about the central axis 16 of the magnetic structure 14. When said structure 14 rotates in an anti-clockwise direction by an angle α relative to the frame of the structure 8, said structure is subject to a circular translation in a clockwise direction over an angular distance β. Thus, the central axis 10 rotates about the central axis 16 following a circular trajectory. The angle β is greater than the angle α and proportional thereto. Said angles α and β are proportional to the two frequencies F1 and F2 as $\beta/\alpha=R_{Fr}=F1/F2=N2/\Delta N=7$. It will be seen that the magnet considered 12A and the central axis 10 remained aligned on a vertical straight line. In FIG. 3D, it can be seen that, when the structure 14 has rotated by a half-period P2 (α=P2/2), the angle β is equal to 180° (β=180°). For a rotation of the structure 14 corresponding to the angular period thereof P2, the central axis 10 of the resonant structure makes a complete rotation (case ΔN=1).

Figure 4:
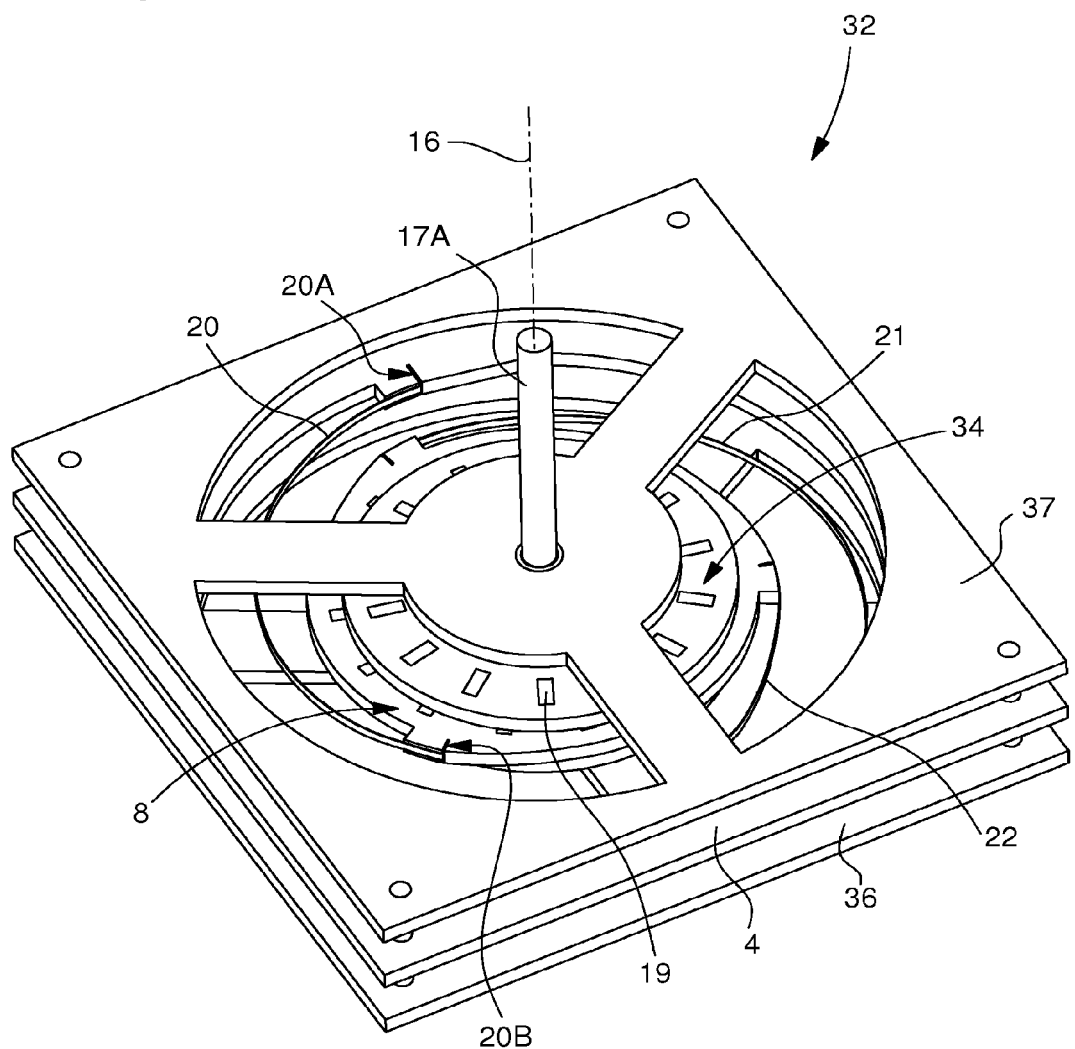
FIG. 4 shows in perspective a second embodiment of a regulating device according to the invention.
Figure 5:
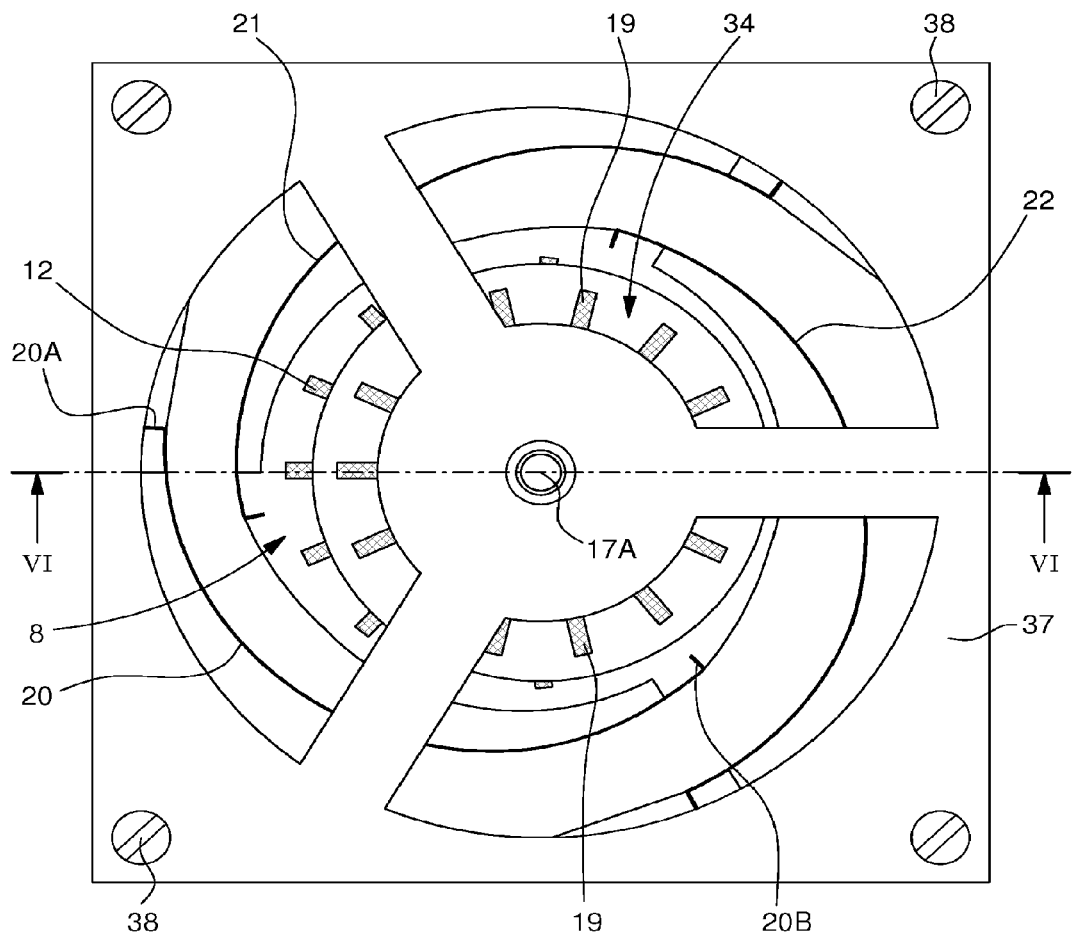
FIG. 5 is a view from above of the regulating device of FIG. 4.
Figure 6:
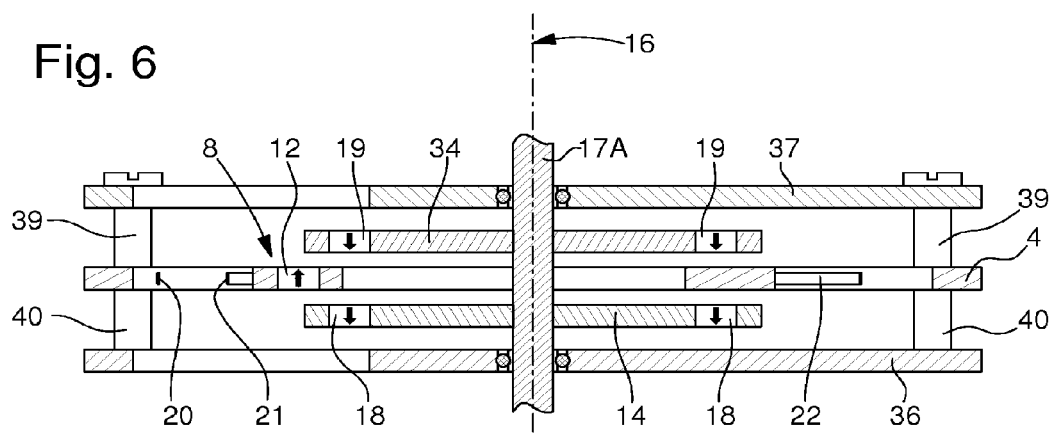
FIG. 6 is a cross section along the line VI-VI of FIG. 5.

Shown in FIGS. 4 to 6 is a second embodiment. The regulating device 32 has the same elements as the first embodiment which will not be described again here. Said regulating device 32 operates in a similar way to the device 2 described previously. It is different therefrom in that it comprises a third magnetic structure 34 which has a similar configuration to the second magnetic structure 14 and is rigidly connected thereto. The two similar magnetic structures 14 and 34 are aligned in the direction defined by the second central axis 16 and are arranged on both sides of the magnetic structure 8 at substantially the same distance therefrom. The resonant magnetic structure 8 and the resilient structure connecting said magnetic structure to the plate 4 of the frame are identical to those described previously. The positioning of the resonant magnetic structure relative to the magnetic structure 14 or 34 respectively is also identical to that of the first embodiment. In FIG. 5, the resonator 8 is actuated and the structure 8 is in a position of the circular trajectory which said structure follows in the excited resonant mode. The frame comprises a lower plate 36 and an upper plate 37 in which the shaft 17A is mounted rotating about the central axis 16 by means of two ball bearings. In a variant, said shaft 17A may be pivoted in conventional bearings or in magnetic bearings. The plates 4, 36 and 37 are attached by screws 38 and held fixed in general parallel planes by spacers 39 and 40 through which the screws pass. The illustration of the plates and the assembly thereof is schematic in the figures, it being possible for each of said plates to form a base plate or bridge of a horological movement in which the regulating device 32 is arranged.

The magnetic structures 14 and 34 are attached to the shaft 17A and driven simultaneously in rotation by torque. Said two similar structures have the magnets thereof 18 and 19 aligned axially and are axially magnetised in the same direction whereas the magnets 12 of the resonant magnetic structure 8 are axially magnetised in the opposite direction. Thus, each of the magnetic structures 14 and 34 has the magnets thereof arranged in repulsion relative to the magnets of the intermediate structure 8. This is a major advantage of said second embodiment as the axial magnetic forces to which the resonant magnetic structure 8 is subject are cancelled overall. In a variant, the two similar structures are mounted on two coaxial shafts and at least one of said shafts receives torque. In a first particular variant, a first shaft receives torque whereas the second shaft is driven in rotation by the resonant magnetic structure at the same frequency as the rotational frequency of the first shaft. In a second particular variant, the two shafts each receive torque in order to excite and maintain the resonant mode. The resonator synchronises the rotational frequencies of the two shafts.

In another embodiment that has not been illustrated, it is the resonant magnetic structure 8 which is duplicated, in other words the resonator comprises two similar resonant magnetic structures that are rigidly connected in movement. The two resonant magnetic structures are aligned in the axial direction and arranged on both sides of a magnetic structure that excites the expected resonant mode (similar to the structure 14 described previously) at substantially the same distance therefrom. The two resonant magnetic structures may be connected to the frame by the same median resilient structure or by two resilient structures that extend respectively in the general planes of said two resonant magnetic structures. In a variant of the last case, the two resonant magnetic structures are independent and arranged to have a substantially identical resonance frequency.

With the aid of FIGS. 7 to 10, four variants of a third embodiment of a regulating device according to the invention will be described. It will be seen immediately that the first variant corresponds in its operating principle to the first and second embodiments described previously in the variant where the frame is fixed relative to the horological movement. Thus, the general explanations given for the operation of the regulating device and the various mathematical relationships also apply to said third embodiment.

The third embodiment is distinguished from the first embodiment basically in that the first and second magnetic structures of the regulating device are arranged in the same general plane, one of said first and second magnetic structures being situated inside the other; and in that the magnetised material forming at least one of the two magnetic structures is magnetised radially. In the variants described below, the two magnetic structures each comprise a plurality of magnets that are magnetised radially. In the first and second variants, the magnets of one structure are arranged to repel the magnets of the other structure. In the third and fourth variants, the magnets of one magnetic structure are arranged to attract the magnets of the other magnetic structure. In the first case, the circular movement of the resonant magnetic structure is such that the magnets thereof follow cycloid trajectories so that the magnet or the two magnets of said resonant magnetic structure which are radially closest to the magnets of the rotating magnetic structure (undergoing rotation relative to the frame) is/are substantially shifted. In the second case, the magnet or the two magnets of the resonant magnetic structure which is/are radially closest to the magnets of the rotating magnetic structure is/are substantially aligned thereto.

It will be further observed that in the variants described below, the inner magnetic structure has eighteen magnets whereas the outer magnetic structure has twenty magnets. There is therefore a difference in magnets ΔN=+/−2. The result is that the resonance frequency F1=+/−F2·N2/2, where F2 and N2 are the rotational frequency and the number of magnets of the rotating magnetic structure respectively, in accordance with the explanations given earlier. Thus, when the rotating magnetic structure has made a rotation corresponding to the angular magnetic period thereof P2, the resonant magnetic structure has made a circular translation by an angle of +/−180° as P2·N2=360°. Given that, with a difference in magnets as an absolute value of greater than one, that is |ΔN|>1, overall there is no radial magnetic force when the central axes of the two magnetic structures are merged, mechanical means are provided to decentre initially the resonant magnetic structure relative to the rotating magnetic structure, so as to produce an initial magnetic coupling between the two magnetic structures which is sufficient to allow starting of the regulating device by the relative rotation of the rotating magnetic structure and thus to excite the expected resonant mode, said resonant mode being then maintained by said relative rotation of said rotating magnetic structure within the useful torque range. In other variants of the third embodiment, corresponding to the above-mentioned four variants, provision is made for a difference in magnets as an absolute value equal to one, that is |ΔN|=1, the magnets being arranged either in repulsion, or in attraction. It will be observed finally that the different variants of the third embodiment described below may also apply to the other embodiments of the invention, in particular to the other embodiments given in the present description of the invention, in other words to embodiments where the resonant magnetic structure and the rotating magnetic structure are arranged in different general planes, in particular with the magnets of said magnetic structures being axially magnetised.

Figure 7:
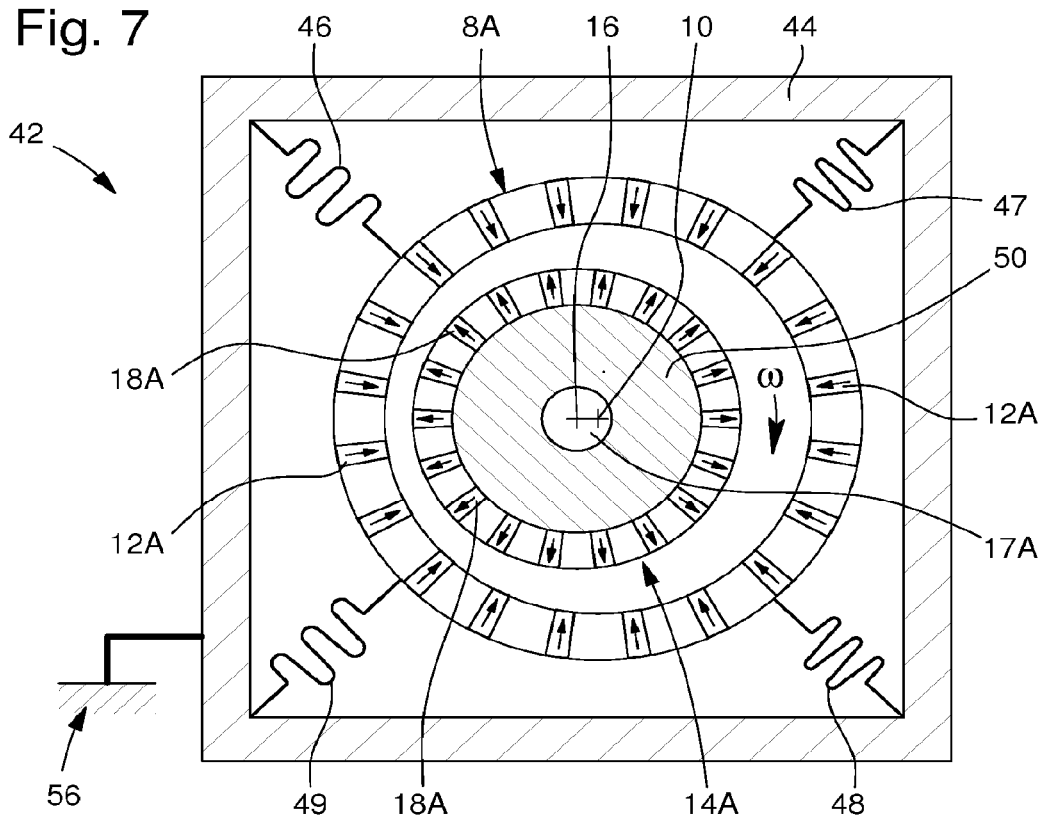
FIG. 7 is a schematic plan view of a first variant of a third embodiment.

The regulating device 42 of FIG. 7 comprises:
- a framework 44 forming a frame that is rigidly connected to the horological movement in which the regulating device is incorporated;
- an annular resonant magnetic structure 8A comprising at the inner periphery thereof a plurality of magnets 12A arranged in a circle and defining a central axis 10;
- a rotating mobile comprising at the outer periphery thereof a plurality of magnets 18A arranged in a circle and defining a rotating magnetic structure 14A, said mobile being arranged inside the structure 8A and comprising a central non-magnetic disk 50 mounted on a shaft 17A of which the axis of rotation is merged with the central axis 16 of the rotating magnetic structure;
- a resilient structure formed of four identical springs 46,47,48 and 49 which are arranged in pairs on two orthogonal geometric axes (specifically when the central axes 10 and 16A are merged), the anchorings of each pair of springs on the frame and on the resonant magnetic structure being diametrically opposite.

The magnetic structure 14A is driven in rotation by torque with an angular velocity ω depending on the resonance frequency when the resonant mode is excited and stabilised. Said magnetic structure thus forms an escapement wheel of the regulating device 42 to which the torque supplied is applied. To have an isotropic return force generated by the resilient structure, the distance between the two anchorings of a spring is identical for the four springs when the central axes 10 and 16 are merged. Said springs are each formed by a resilient strip having in plan view a sinuous profile. Different variants may be envisaged by persons skilled in the art.

Figure 8:
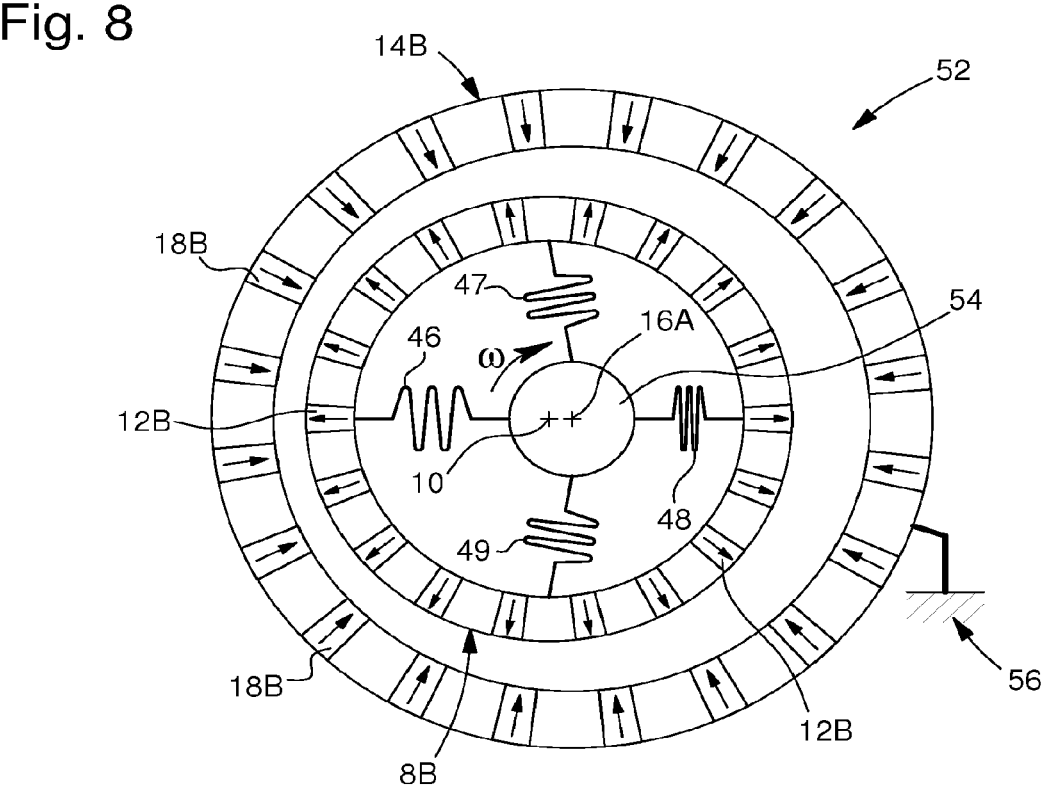
FIG. 8 is a schematic plan view of a second variant of the third embodiment.

The regulating device 52 of FIG. 8 comprises:
- an annular magnetic structure 14B comprising at the inner periphery thereof a plurality of magnets 18B arranged in a circle and defining a central axis 16A, said magnetic structure being rigidly connected to the horological movement in which the regulating device is incorporated (shown diagrammatically by a material link to a mass 56);
- a frame formed by a central shaft 54 of which the axis of rotation is merged with the central axis 16A and arranged inside the structure 14B;
- an annular resonant magnetic structure 8B comprising at the outer periphery thereof a plurality of magnets 12B arranged in a circle and defining a central axis 10, said resonant magnetic structure being arranged inside the structure 14B and the central shaft 54 being situated inside the structure 8B;
- a resilient structure formed of four identical springs 46,47,48 and 49 which are arranged in pairs on two orthogonal geometric axes (specifically when the central axes 10 and 16A are merged), the anchorings of each pair of springs on the frame and on the resonant magnetic structure being diametrically opposite.

The central shaft 54 is driven in rotation by torque with an angular velocity ω depending on the resonance frequency when the resonant mode is excited and stabilised. The frame thus forms an escapement wheel to which the torque supplied to the regulating device 52 is applied. To have an isotropic return force generated by the resilient structure, the distance between the two anchorings of a spring is identical for the four springs when the central axes 10 and 16A are merged. Said springs are each formed by a resilient strip having in plan view a sinuous profile. Different variants may be envisaged by persons skilled in the art. It will be noted that, although fixed relative to the horological movement, the magnetic structure 14B has a relative rotation in relation to the frame 54 about the central axis thereof 16A, which has a determined fixed position relative to the frame. Thus, in the terminology used, the structure 14B defines a rotating magnetic structure in the reference system linked to the frame.

Figure 9:
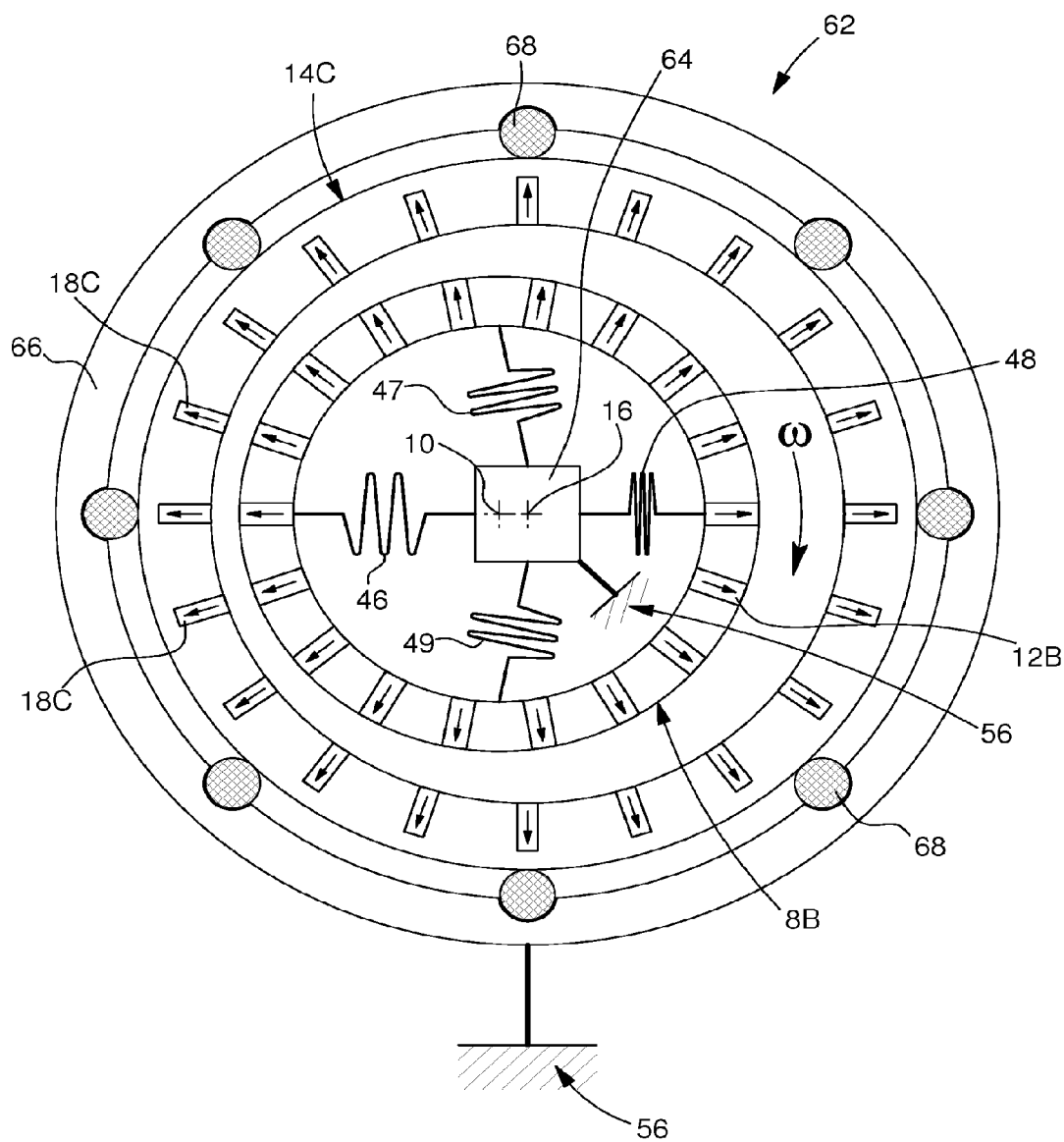
FIG. 9 is a schematic plan view of a third variant of the third embodiment.

The regulating device 62 of FIG. 9 comprises:
- a frame rigidly connected to the horological movement in which the regulating device is incorporated (shown diagrammatically by a material link to a mass 56), said frame being formed by a central block 64 and by an outer support 66 that has a circular opening;
- an annular rotating magnetic structure 14C comprising at the inner periphery thereof a plurality of magnets 18C arranged in a circle and defining a central axis 16, said structure 14C having a circular outer surface and rotating about the central axis thereof 16 inside the outer support 66 which guides said structure in rotation by a ball bearing 68;
- an annular resonant magnetic structure 8B comprising at the outer periphery thereof a plurality of magnets 12B arranged in a circle and defining a central axis 10, said structure 8B being arranged inside the structure 14C and the central block 64 being situated inside said structure 8B;
- a resilient structure formed of four identical springs 46,47,48 and 49 which are arranged in pairs on two orthogonal geometric axes (specifically when the central axes 10 and 16A are merged), the anchorings of each pair of springs on the frame and on the resonant magnetic structure being diametrically opposite.

The magnetic structure 14C is driven in rotation by torque with an angular velocity ω depending on the resonance frequency when the resonant mode is excited and stabilised. It thus forms an escapement wheel of the regulating device 62. The springs 46,47,48 and 49 are similar to those of the previous variant (FIG. 8) and are arranged in a similar way.

Figure 10:
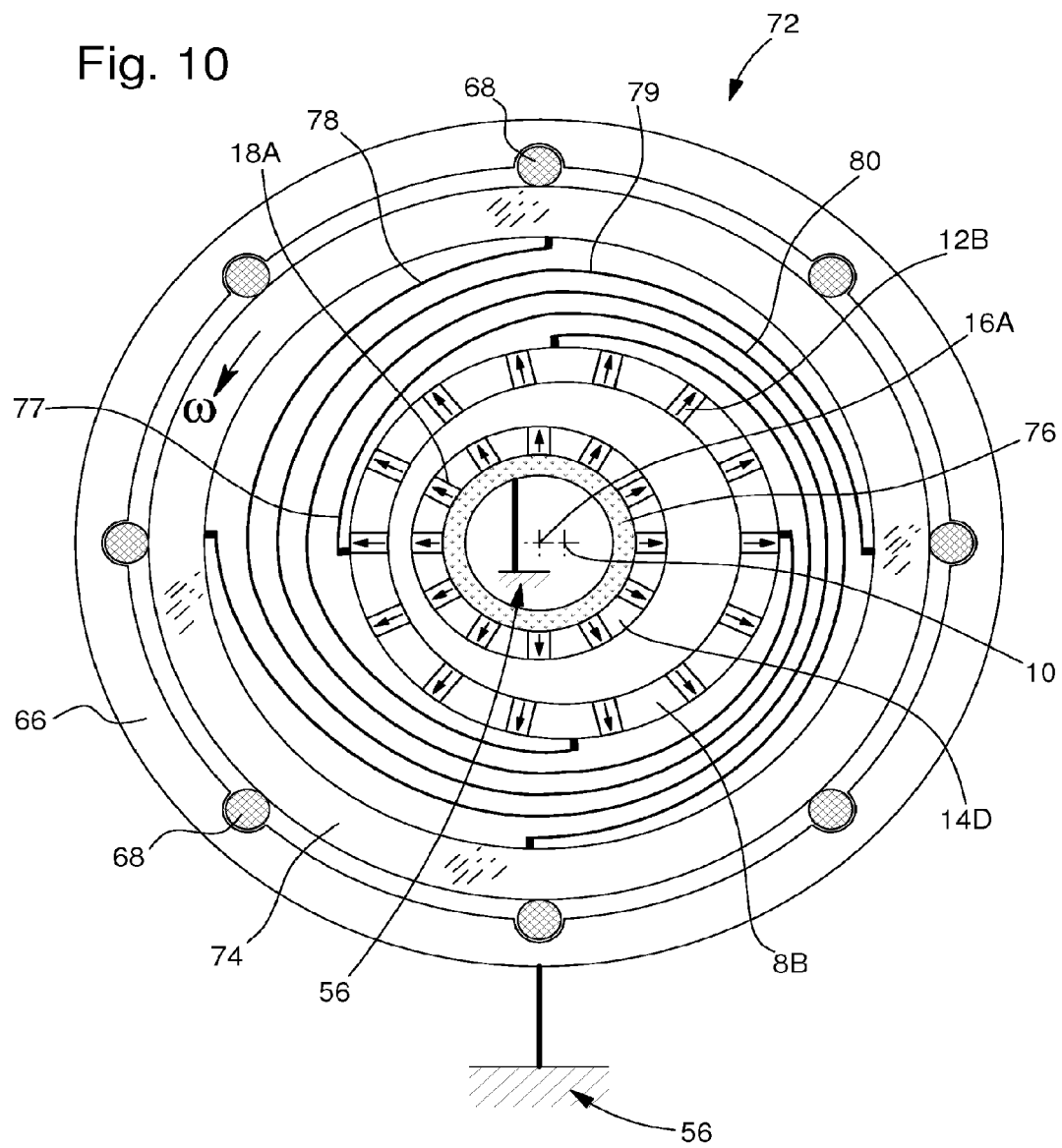
FIG. 10 is a schematic plan view of a fourth variant of the third embodiment.

The regulating device 72 of FIG. 10 comprises:
- a central magnetic structure 14D comprising at the outer periphery thereof a plurality of magnets 18A arranged in a circle and defining a central axis 16A, said central magnetic structure being rigidly connected to the horological movement in which the regulating device is incorporated (shown diagrammatically by a material link to a mass 56);

an outer support 66 having a circular opening and also rigidly connected to the horological movement in which the regulating device is incorporated;

a frame formed by an annular rotating support 74 of which the axis of rotation is merged with the central axis 16A and arranged inside the outer support 66, said annular support 74 having a circular outer surface and rotating inside the outer support 66 which guides said support in rotation by a ball bearing 68;

an annular resonant magnetic structure 8B comprising at the inner periphery thereof a plurality of magnets 12B arranged in a circle and defining a central axis 10, said structure 8B being arranged inside the annular rotating support 74 and the central magnetic structure 14D being situated inside said structure 8B;

a resilient structure formed of four resilient strips in a spiral 77, 78, 79 and 80 which are identical and arranged between the resonant magnetic structure 8B and the annular rotating support 74 to which said four resilient strips are attached respectively at the two ends thereof.

The annular rotating support 74 is driven in rotation by torque with an angular velocity ω depending on the resonance frequency when the resonant mode is excited and stabilised. Said support therefore forms an escapement wheel of the regulating device 72. The four resilient strips in a spiral are shifted by an angle of 90° and are interleaved without touching one another. In the variant shown, each resilient strip defines substantially a spiral (which extends substantially over an angular distance of 360°). Thus the two anchorings of each resilient strip to the resonant magnetic structure and to the annular rotating support respectively are substantially aligned in a radial direction of said annular rotating support. It will be observed that the resilient strips in a spiral may have various lengths, in particular to make one and a half revolutions (540°) so that the two anchorings of each resilient strip are substantially diametrically opposite relative to the central axes 10 and 16A. This last variant is advantageous.

With the aid of FIGS. 11, 12, 13A and 13B, a fourth embodiment of the invention will be described below. The regulating device according to said fourth embodiment is an improved device which associates a mechanical anti-loss-of-synchronisation system of the coupling between the resonant magnetic structure and the rotating magnetic structure with any one of the embodiments described previously, in order to ensure the operation of the horological movement which incorporates the regulating device within a more extended torque range and also to prevent an above-mentioned loss of synchronisation of the coupling in the event of angular impacts or accelerated movements that produce torque higher than the useful range envisaged. The various elements already described and the operation of the magnetic system of the regulating device will not be described again here. A 'mechanical anti-loss-of-synchronisation system' means in a general way a system that ensures synchronisation between the resonant magnetic structure and the rotating magnetic structure within a torque range where the purely magnetic coupling might no longer suffice or might not fulfil its function sufficiently precisely or reliably and also in the event of greater torque generated momentarily by impacts or high acceleration movements. Said system may therefore already intervene preferably before the magnetic interaction between said two structures is no longer sufficient to provide said synchronisation, in other words before reaching an amount of torque that causes a loss of synchronisation of the purely magnetic coupling. In a variant, it is therefore possible to provide such a system as a complementary mechanical system to the magnetic system of the regulating device of the invention, said complementary mechanical system only intervening in the upper portion of the total range of torque envisaged for the operation of said regulating device, the higher value of said total range however being less than the torque that produces a loss of synchronisation of the purely magnetic coupling. In said last case, the complementary mechanical system nevertheless has a safety function ensuring that an amount of torque that is momentarily higher than the normal operating range does not lead to a loss of synchronisation. In another variant, it is possible to provide for the mechanical anti-loss-of-synchronisation system to intervene substantially only when the loss-of-synchronisation torque is reached and then exceeded.

The variant of the fourth embodiment which is shown in the figures is based on the second embodiment of the invention. The frame, the resilient structure and the two rotating magnetic structures mounted on the shaft 17A (magnetic structures 14 and 34 bearing a number N2 of magnets 18 and the same number N2 of magnets 19 respectively) are identical to the corresponding portions of the variant of the second embodiment shown in FIGS. 4 to 6. The resonant magnetic structure comprises a number N1 of magnets, N1 being different from N2 as already explained. In a general way, the mechanical anti-loss-of-synchronisation system is formed by a planetary gear with a planet wheel 86 provided with a first set of teeth 88 and rotating inside a crown 84 provided inside a second set of teeth 90. Next, the planet wheel is associated with the structure 14 that has the lower number of angular periods from among the first and second magnetic structures 8 and 14 (the lower number of magnets from among the two numbers N1 and N2), and the crown is associated with the other structure 8 that has the higher number of angular periods (the higher number of magnets from among the two numbers N1 and N2). To provide the anti-loss-of-synchronisation function, the portion of the planetary gear associated with the second magnetic structure 14 should be rigidly connected in rotation to said second structure.

Provision is made for the first and second sets of teeth to penetrate one another at least in part at least in an upper zone of the useful torque range expected for a purely magnetic coupling, the higher value of said upper zone defining the maximum value of said useful range. Finally, the first and second sets of teeth 88 and 90 are configured and arranged relative to one another so that, within the useful range of purely magnetic coupling, said first and second sets of teeth do not touch one another.

In a main variant, the relationship $R_Z$ between the number Z1 of teeth 90 of the crown and the number Z2 of teeth 88 of the planet wheel is equal to the relationship $R_M^*$ between the higher number and the lower number of angular periods. Thus, $R_Z=Z1/Z2=R_M^*=\text{Sup}(N1,N2)/\text{Inf}(N1,N2)$ where Inf (N1,N2) is the lower value of the numbers N1 and N2 whereas Sup (N1,N2) is the higher value of said numbers N1 and N2.

In a particular variant shown in the figures, the number Z2 of teeth 88 of the planet wheel 86 is identical to the number N2 of magnets of the magnetic structure 14, 34 respectively. Similarly, the number Z1 of teeth 90 of the crown 84 is identical to the number N1 of magnets of the magnetic structure 8.

In the variant shown in the figures, the crown 84 forms the non-magnetic support of the resonant magnetic structure 8. Said two elements are therefore rigidly connected and together form a single component. In said variant, the number Z1 of teeth 90 of the crown is preferably identical to the number N1 of magnets 12 of the resonant magnetic structure, the magnets being substantially aligned on the teeth, as shown in the figures. It will be seen next, in an improved variant, that the angular positions of the teeth may be shifted relative to the angular positions of the magnets in order to increase the useful range of purely magnetic coupling. To do this, it will be observed that the teeth and the magnets may be provided at two different regions of the component which together they form, in particular to allow a tooth design independent of that of the magnets and the arrangement thereof in said component. In other variants, the crown and the planet wheel are in a different general plane to that of the resonant magnetic structure, the crown and said structure being formed in particular by two distinct elements. In a first variant, the crown and the resonant magnetic structure are rigidly connected and attached together to the frame by a single resilient structure. In a second variant, the crown and the resonant magnetic structure are also rigidly connected and form two distinct elements, but provision is made for two resilient structures attached respectively to said two distinct elements. In a third variant, the crown and the resonant magnetic structure form two distinct elements and are not rigidly connected to one another directly (in the sense of being attached to one another), but each is attached to the frame by its own resilient structure. In said third variant however, the crown and the resonant magnetic structure are associated with one another because the crown with the first resilient structure thereof is arranged to have a substantially identical resonance frequency to that of the resonant magnetic structure with the second resilient structure thereof.

In the variant shown in the figures, the planet wheel is a distinct element of the magnetic structures 14 and 34. However, in other variants, the planet wheel may form the same component with one of said two magnetic structures (in other words with a rotating magnetic structure). Thus, the plurality of magnets of the rotating magnetic structure are incorporated in or on the planet wheel. Preferably, the number Z2 of teeth 88 of the planet wheel is identical to the number N2 of magnets 18 of the rotating magnetic structure 14, the magnets being substantially aligned on the teeth. Said situation also occurs in a variant where the two pluralities of magnets are arranged in attraction. It will be seen below, in an improved variant, that the angular positions of the teeth may be shifted relative to the angular positions of the magnets to increase the useful range of purely magnetic coupling. In the other above-mentioned variants, it possible basically to distinguish two main variants. In the first main variant, the crown and the planet wheel are in a different general plane to that of the resonant magnetic structure and the rotating magnetic structure is also arranged in said different general plane. In the case where there are two rotating magnetic structures, as in the figures, it is possible in a particular variant to duplicate the planetary gear and arrange said two similar planetary gears in the two general planes of said two rotating magnetic structures. The second main variant is based on the third embodiment described previously. In this case, the crown and the magnetic structure that has the larger diameter together form a first component and the planetary wheel and the magnetic structure that has the smaller diameter together form a second component, the first and second components being substantially situated in the same general plane. It will be noted however that the teeth and the magnets may be provided at two different regions in particular to allow a design of the teeth that is independent of that of the magnets and the arrangement thereof in the corresponding component.

Figure 13A:
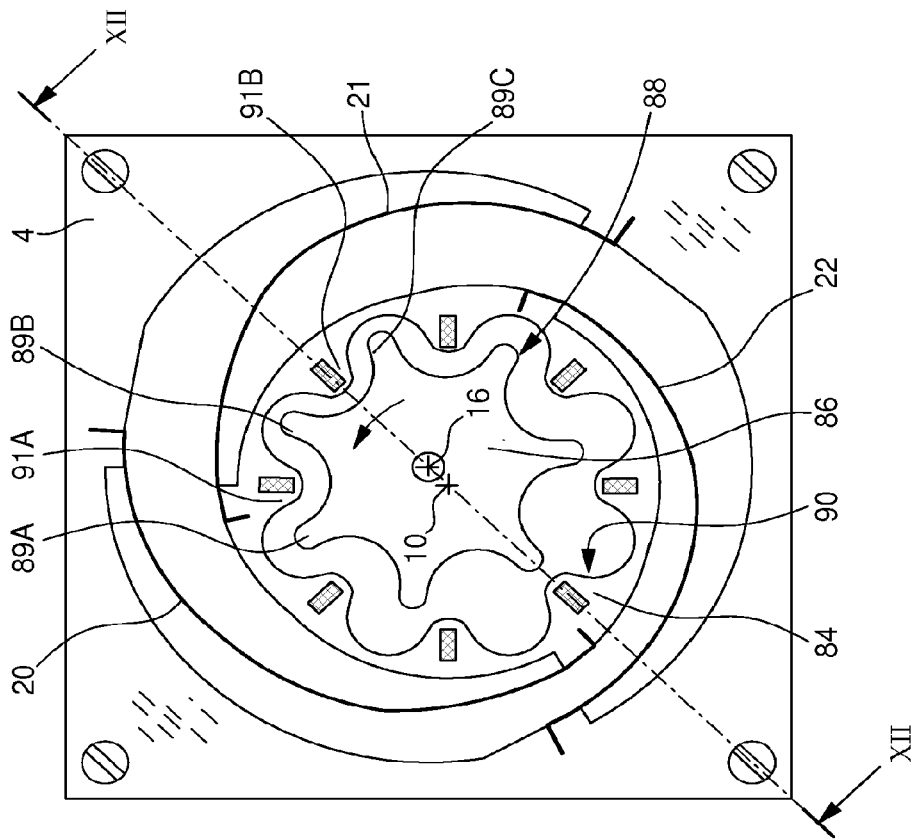
FIGS. 13A and 13B show the regulating device of the fourth embodiment in two successive positions.
Figure 13B:
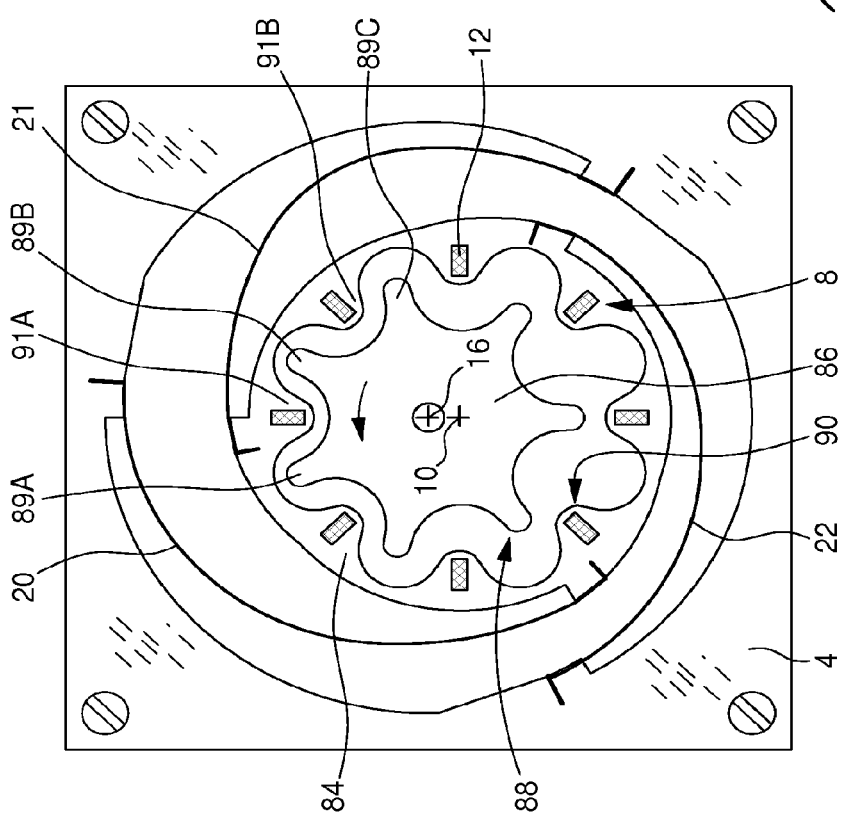

FIGS. 13A and 13B show the regulating device 82 in the region of the plate 4 in two successive positions respectively when torque force is applied to the shaft 17A, producing a rotation of the magnetic structures 14 and 34 and of the planet wheel 86. The planetary gear defines a mechanical cycloid gear which operates in a similar way to the magnetic cycloid gear. In the example shown in FIGS. 13A and 13B, the torque applied is within the expected useful range for purely magnetic coupling. In this case, the crown 84 rolls virtually without slipping and without contact about the planet wheel 86 by the effect of magnetic interaction. In other words, within the above-mentioned useful range, the primitive circles of the crown and of the planet wheel have the same relationship as those of the magnetic structures 8 and 14, but the scale of the primitive circles of the planetary gear is chosen and the design of the sets of teeth 88 and 90 is conceived so that the sets of teeth do not touch one another. In the first relative position of the planet wheel 86 and of the crown 84 shown in FIG. 13A, the tooth 91A of the crown is centred in the space between the teeth 89A and 89B of the planet wheel. It will be observed that tangential play is provided on each side of the tooth 91A, and the same applies to the adjacent teeth (for example the tooth 91B) which normally have at least as much tangential play. Moreover, radial play is provided allowing the amplitude of the resonance movement to be increased. The situation shown corresponds in particular to torque of less than the maximum value of the expected useful range for a purely magnetic coupling. On continuing the rotation of the planet wheel, the virtual roll without slipping and without contact of the two sets of teeth is observed and the second relative position of FIG. 13B is attained where the crown (which has the central axis 10) has been subject to circular translation about the axis 16 of the planet wheel. In said second relative position, the same situation is found as in the first relative position, but with an angular shift corresponding to the angular shift between two magnets or two adjacent teeth of the crown 84. Thus, the tooth 91B is centred in the space between the teeth 89B and 89C of the planet wheel and the tangential play as well as the radial play are similar to those of the first relative position.

In a first variant, the first and second sets of teeth penetrate one another at least in the major portion of said useful range of said torque. In a second variant, the first and second sets of teeth penetrate one another over said entire useful range and finally, in a third variant corresponding to the example shown in the figures, the first and second sets of teeth also penetrate one another when no torque is applied to said regulating device. Said last variant may be advantageous because the set of teeth of a first portion of the planetary gear associated with the rotating magnetic structure then produces an initial decentring of the resonant magnetic structure since teeth of the second portion of the planetary gear associated therewith are substantially aligned with a few teeth of the first portion of the planetary gear. This therefore allows the regulating device to be actuated in the case where the difference as an absolute value $|\Delta N|=|N1-N2|$ is greater than one, that is $|\Delta N|>1$, as already explained previously.

In a particular variant, the regulating device is provided to operate with a purely magnetic coupling within a first useful torque range and then with a magneto-mechanical coupling within a second useful range of said torque which is greater than the first useful range and contiguous thereto. The maximum value of the first useful range is such that it is less than a loss-of-synchronisation value of the purely magnetic coupling. Within the second useful range, the two respective sets of teeth of the crown and of the planet wheel mesh with one another so that one applies a mechanical driving torque to the other which is added to the magnetic driving torque. The two sets of teeth are configured and arranged relative to each other so that, at least in a lower zone of the second useful range, the lower value of which defines the minimum value of said second useful range, said two sets of teeth have radial play allowing an increase in the amplitude of the substantially circular translation of the resonance movement during an increase of the torque. Finally, the resilient structure is arranged so that it has a substantially resilient deformation, preferably a purely resilient deformation, in the first and second useful ranges of torque applied to the regulating device.

Figure 11:
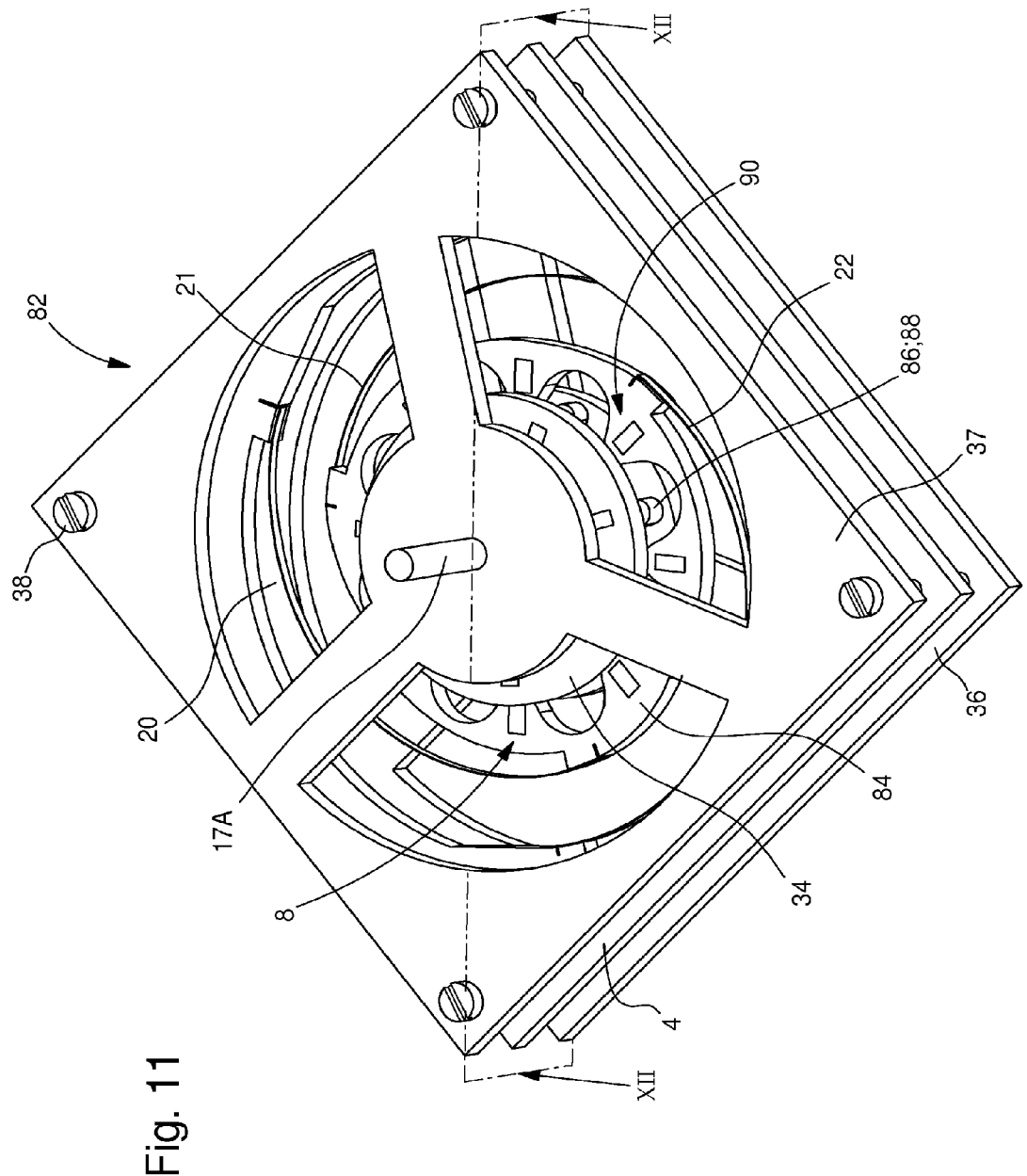
FIG. 11 shows in perspective a fourth embodiment of a regulating device according to the invention.
Figure 12:
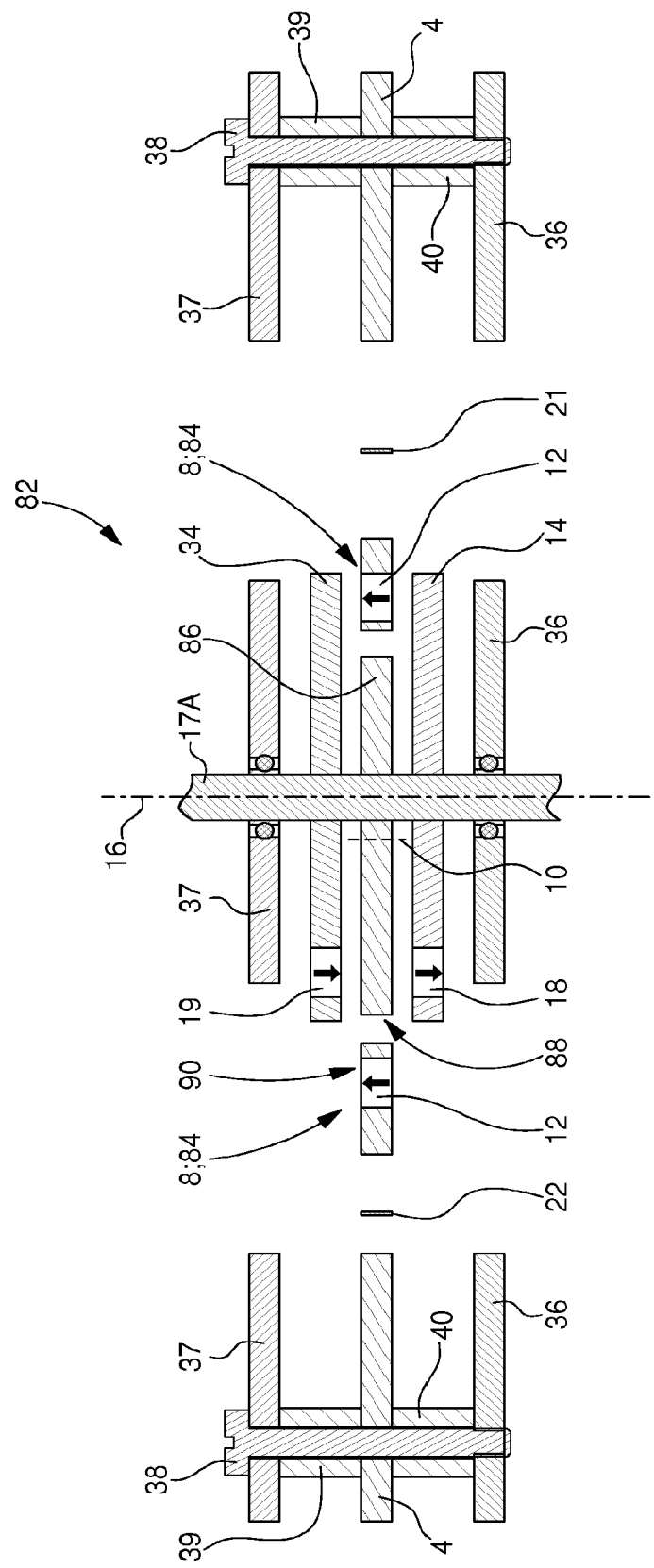
FIG. 12 is a cross section of FIG. 11 along a cutting plane comprising the central axis of rotation.

In the context of said fourth improved embodiment, observation of the purely magnetic coupling as a function of torque is important in order to optimise the regulating device. For a first relatively low amount of torque, the magnetic interaction is such that in the first magnetic meshing zone (the zone where the magnets of the resonant magnetic structure are radially closest to the magnets of the rotating magnetic structure) there is a first displacement (also known as angular shift) between the magnets of the two magnetic structures (for example relative to the axis of rotation of the rotating magnetic structure). By increasing the torque, said displacement is changed and a second displacement is obtained which is different from the first for a second amount of torque which is greater than the first torque. More specifically, the angular shift between the magnets of the two magnetic structures in the direction of the torque applied diminishes when said torque increases and said angular shift, which is in particular close to a magnetic half-period for low torque, may become relatively low for torques that are close to, but less than, the loss-of-synchronisation torque of the magnetic coupling. If, as shown in FIG. 11, the magnets of the two magnetic structures are radially aligned on the teeth of the two portions of the planetary gear which are rigidly connected respectively to said two magnetic structures, the following problem occurs. The two sets of teeth will come in contact, in other words the lateral flanks of the respective teeth thereof will touch one another and mechanical drive will occur for a torque that is still far from the torque that causes a loss of synchronisation of the magnetic coupling; the consequence of this is to limit the useful range of purely magnetic coupling. However, with purely magnetic coupling there is no contact and therefore no friction and no mechanical interaction forces in the region of the sets of teeth. Said mechanical interaction forces may cause not only an energy output problem, but also an operating problem for the resonant mode of the resonator and a precision problem for the regulating device. This is because the resilient structure of the resonator and the operating conditions of the horological movement incorporating the regulating device in question may produce a natural resonance movement which does not follow a truly circular trajectory, and the same applies to the resonance movement resulting from the magnetic coupling provided. It is therefore desirable to have a useful range of purely magnetic coupling that is as wide as possible for correct operation of the horological movement within an extended useful range, and thus to be able come as close as possible to the amount of torque that causes a loss of synchronisation in the magnetic coupling without the sets of teeth coming in contact and without mechanical torque being transmitted via the resulting mechanical coupling.

Following the above observations, an improved variant of the fourth embodiment is proposed in which the first set of teeth of the planet wheel is arranged relative to the second set of teeth of the crown so that, within the zone of the useful torque range in which said first and second sets of teeth penetrate without contact, teeth of the first set of teeth situated in corresponding spaces of the second set of teeth, in the zone where the first and second sets of teeth are radially closest, are substantially centred within a given total amount of tangential play for a relative median displacement (angular shift), between the angular periods of the first magnetic structure and the angular periods of the second magnetic structure, within a relative displacement range (angular shift) defined by a variation of the torque within said useful range.

In a variant where the mechanical planetary gear is situated in a different general plane to the general plane or general planes of the magnetic cycloid gear, there is complete latitude to configure the two gears independently of one another and to produce the improved variant described above optimally. In the case where a magnetic structure is provided in the same general plane as the mechanical gear, but the other magnetic structure is in a general plane where there is no portion of said mechanical gear, the magnets of said other magnetic structure can be easily shifted angularly by an optimal angular distance relative to the teeth of the portion of the mechanical gear that is rigidly connected to said other magnetic structure. In the case of the third embodiment, provision is advantageously made to arrange the mechanical gear in a different region to that of the magnets, each magnetic structure and the corresponding portion of the mechanical planetary gear forming together a compact component that has the two regions of meshing. However, if only one region is to be provided with the magnets arranged in repulsion, the heads of the teeth or half-teeth of the sets of teeth may be made of a magnetised material. In a variant with the magnets arranged in attraction, a plurality of magnets may be provided inside the circle defined by the bottoms of the spaces of the corresponding set of teeth; which makes it possible to have said plurality of magnets aligned substantially radially with the spaces of said set of teeth.

The invention claimed is:

1. A device for regulating motion of a mechanical horological movement, the regulating device comprising:
   a frame;
   a resonator attached to the frame and comprising a first annular periodic magnetic structure including a first whole number N1 of angular periods and which defines a first central axis, the first magnetic structure forming an inertial portion of the resonator;
   a second annular periodic magnetic structure including a second whole number N2 of angular periods and which defines a second central axis, the second number N2 being different from the first number N1, the second magnetic structure being configured to rotate relative to the frame about the second central axis which has a determined position relative to the frame;
   wherein at least one magnetic structure from among the first and second magnetic structures includes magnetized material in each of the angular periods thereof;
   the resonator is configured to have a resonant mode in which the first magnetic structure is subject to a curvilinear translation relative to the frame about the second central axis with a resonance frequency F1;
   the first and second magnetic structures are configured to have a magnetic interaction between them such that a rotation at a frequency F2 of the second magnetic structure relative to the frame and about the second central axis, by application of torque within a useful torque range, allows the resonant mode to be excited and such that the frequency F2 of the relative rotation of the second magnetic structure and the resonance frequency F1 have between them, within the useful torque range, a given relationship $R_{Fr}$, that is $R_{Fr}=F1/F2$, which is equal to the second whole number N2 divided by the difference ΔN between the second whole number N2 and the first whole number N1, such that ΔN=N2−N1 and $R_{Fr}=N2/\Delta N$.

2. An horological regulating device according to claim 1, wherein the resonator comprises a resilient structure connecting the first magnetic structure to the frame, the resilient structure being configured so that the first magnetic structure has a rest position in which the first and second central axes are substantially merged, and to apply a return force substantially in a direction of the second central axis whatever the angular position of the first magnetic structure relative to the second central axis.

3. The horological regulating device according to claim 2, wherein return force of the resilient structure is substantially isotropic and substantially proportional to the distance between the first and second central axes.

4. A regulating device according to claim 2, wherein the relationship $R_{Fr}$ is greater than five, $R_{Fr}>5$.

5. The regulating device according to claim 2, wherein the first magnetic structure comprises a first plurality of magnets distributed regularly in a circle and of which the number is equal to the number N1, and the second magnetic structure comprises a second plurality of magnets distributed regularly in a circle and of which the number is equal to the number N2.

6. The regulating device according to claim 5, wherein the second plurality of magnets is arranged in repulsion relative to the first plurality of magnets.

7. The regulating device according to claim 1, wherein the first and second magnetic structures are arranged in two general parallel planes that are distant from one another.

8. The regulating device according to claim 7, wherein magnetized material of the at least one magnetic structure is magnetized axially.

9. The regulating device according to claim 7, further comprising a third magnetic structure which has a similar configuration to the first or second magnetic structure, the two similar magnetic structures being aligned in the direction defined by the first central axis or the second central axis respectively and arranged on both sides of the different magnetic structure at substantially a same distance therefrom.

10. The regulating device according to claim 1, wherein the first and second magnetic structures are arranged in a same general plane, one of the first and second magnetic structures being situated inside the other; and magnetized material of the at least one magnetic structure is magnetized radially.

11. The regulating device according to claim 2, wherein the second magnetic structure forms an escapement wheel to which the torque is applied.

12. The regulating device according to claim 2, wherein the frame forms an escapement wheel to which the torque is applied.

13. The regulating device according to claim 1, further comprising a mechanical anti-loss-of-synchronization system between the first and second magnetic structures including a planetary gear with a planet wheel including a first set of teeth and rotating inside a crown provided internally with a second set of teeth, the planet wheel being associated with the structure that has a lower number of angular periods from among the first and second magnetic structures and the crown being associated with the other structure that has a higher number of angular periods;

wherein the structure associated with the second magnetic structure is rigidly connected in rotation to the second structure;

wherein the mechanical anti-loss-of-synchronization system is configured so that, at least in an upper zone of the useful torque range of which the higher value defines the maximum value of the useful range, the first and second sets of teeth penetrate one another at least in part; and wherein the first and second sets of teeth are configured and configured relative to one another so that, within the useful range, the first and second sets of teeth do not touch one another, coupling between the first and second magnetic structures being purely magnetic within the useful range.

14. The regulating device according to claim 13, wherein the relationship $R_Z$ between a number Z1 of teeth of the set of teeth of the crown and a number Z2 of teeth of the set of teeth of the planet wheel is equal to the relationship $R_M^*$ between the higher number of angular periods and the lower number of angular periods.

15. The regulating device according to claim 13, wherein the mechanical anti-loss-of-synchronization system is configured so that the first and second sets of teeth penetrate one another at least in part without touching each other over the entire useful torque range.

16. The regulating device according to claim 13, wherein the useful torque range is a first useful range of purely magnetic coupling of the first and second magnetic structures, the maximum value of the first useful range being less than a loss-of-synchronization value of the purely mechanical coupling, wherein the regulating device comprises a second useful torque range, greater than the first useful range and contiguous thereto, corresponding to a useful range of magneto-mechanical coupling in which the first and second sets of teeth mesh with one another so that one applies a mechanical driving torque to the other;

wherein the first and second sets of teeth are configured and configured relative to one another so that, at least in a lower zone of the second useful range of which the lower value defines the minimum value of the second useful range, the first and second sets of teeth have some radial play allowing an increase of amplitude of the curvilinear translation of the first magnetic structure during an increase in the torque; and wherein the resilient structure is configured to have substantially resilient deformation in the first and second useful ranges of torque applied to the regulating device.

17. The regulating device according to claim 13, wherein the first set of teeth of the planet wheel is arranged relative to the second set of teeth of the crown so that, in a zone of the useful torque range in which the first and second sets of teeth have contactless penetration, some teeth of the first set of teeth situated in the corresponding spaces of the second set of teeth, in a zone where the first and second sets of teeth are radially closest, are substantially centered within a given total tangential play for a median relative angular shift, between the angular periods of the first magnetic structure and the angular periods of the second magnetic structure, within a range of relative angular shift defined by a variation of the torque within the useful range.

18. The regulating device according to claim 2, wherein the difference as an absolute value |ΔN| between the second whole number N2 and the first whole number N1 is equal to one, that is |ΔN|=1.

19. The regulating device according to claim 2, wherein the difference as an absolute value |ΔN| between the second whole number N2 and the first whole number N1 is greater than one, that is |ΔN|>1.

20. The regulating device according to claim 19, further comprising mechanical means to decenter initially the first magnetic structure relative to the second magnetic structure, to produce an initial magnetic coupling between the first and second structures which is sufficient to allow starting of the regulating device by the relative rotation of the second magnetic structure.

21. A mechanical horological movement comprising:
a regulating device;
a counting train regulated by the regulating device; and
a motor device driving the counting train and maintaining a resonant mode of the regulating device;
wherein the regulating device is a regulating device according to claim 1.

22. A mechanical horological movement comprising:
a regulating device;
a counting train regulated by the regulating device; and
a motor device driving the counting train and maintaining a resonant mode of the regulating device;
wherein the regulating device is a regulating device according to claim 3.

23. A mechanical horological movement comprising:
a regulating device;
a counting train regulated by the regulating device; and
a motor device driving the counting train and maintaining a resonant mode of the regulating device;
wherein the regulating device is a regulating device according to claim 5.

24. A mechanical horological movement comprising:
a regulating device;
a counting train regulated by the regulating device; and
a motor device driving the counting train and maintaining a resonant mode of the regulating device;
wherein the regulating device is a regulating device according to claim 13.

25. A mechanical horological movement comprising:
a regulating device;
a counting train regulated by the regulating device; and
a motor device driving the counting train and maintaining a resonant mode of the regulating device;
wherein the regulating device is a regulating device according to claim 16.

* * * * *